United States Patent [19]

Martin et al.

[11] Patent Number: 4,870,611
[45] Date of Patent: Sep. 26, 1989

[54] APPARATUS AND METHOD FOR SYSTEM PRINTING MODE CONTROL

[75] Inventors: Mary S. Martin; Harley D. Puckett, Jr., both of Tucson, Ariz.; Thomas W. Scrutchin, Jr., Poughkeepsie, N.Y.

[73] Assignee: International Business Machines Corporation, Armonk, N.Y.

[21] Appl. No.: 650,341

[22] Filed: Sep. 13, 1984

Related U.S. Application Data

[63] Continuation-in-part of Ser. No. 552,152, Nov. 15, 1983, abandoned.

[51] Int. Cl.⁴ ..................... G06F 3/23; G06F 15/22
[52] U.S. Cl. ........................... 364/900; 364/401; 340/723
[58] Field of Search ............... 364/200, 900, 401; 340/723

[56] References Cited

U.S. PATENT DOCUMENTS

| | | | |
|---|---|---|---|
| 3,226,689 | 12/1965 | Amdahl et al. | 364/900 |
| 3,336,582 | 8/1967 | Beausoleil et al. | 364/900 |
| 3,725,864 | 4/1973 | Clark et al. | 364/900 |
| 3,846,763 | 11/1974 | Riikonen | 364/900 |
| 3,959,776 | 5/1976 | Morley | 364/900 |
| 4,031,519 | 6/1977 | Findley | 364/900 |
| 4,300,206 | 11/1981 | Belleson et al. | 364/900 |
| 4,330,847 | 5/1982 | Kuseski | 364/900 |
| 4,470,129 | 9/1984 | Disbrow et al. | 364/900 |
| 4,604,710 | 8/1986 | Amezcua et al. | 364/900 |
| 4,649,513 | 3/1987 | Martin et al. | 364/900 |
| 4,677,551 | 6/1987 | Suganuma | 364/401 |

OTHER PUBLICATIONS

UNIX System User's Manual, Release 5.0, Jun. 1982, 24 pages of command and facility summary.

Primary Examiner—Emanuel S. Kemeny
Assistant Examiner—Christopher H. Lynt
Attorney, Agent, or Firm—Ratner & Prestia

[57] ABSTRACT

Disclosed is a method and system for creating a visual display of data from an input data set in which the data are not fixed into display-acceptable format until the data are stored in a local memory of the visual display. At least one of a plurality of sources of resource information is initially selected as required by the input data set. Control signals corresponding to the sources of resource information are thereafter embedded into the input data set to form an output data set. Subsequently, the selected sources of resource information and the output data set are applied to the local memory. They are concurrently taken from this local memory to produce a visual display. Fixation of the data into display acceptable format is thereby postponed until just prior to actual display to thereby provide a substantial increase in system flexibility.

65 Claims, 18 Drawing Sheets

APPARATUS AND METHOD FOR SYSTEM PRINTING MODE CONTROL This is a continuation-in-part of application Ser. No. 552,152 filed Nov. 15, 1983, now abandoned.

This application is being filed concurrently with application Ser. No. 650,402, now U.S. Pat. No. 4,649,513 Apparatus and Method for Processing System Printing Data Records on a Page Printer, by Mary S. Martin et al having similar subject matter and assigned to the same assignee as this application.

TABLE OF CONTENTS

Background of the Invention
A. Field of the Invention
B. Background Art
C. IBM 3800 Model 3 Printing Subsystem
Summary of the Invention
Brief Description of the Figures
Dictionary
A. Glossary
B. Acronyms
C. Program
Detailed Description of the Invention
Appendix A—Pseudo-code Listing and control flows of the System Printing Manager
Appendix B—Sniderman Diagrams of the Modules of the Print Services Facility

BACKGROUND OF THE INVENTION

A. Field of the Invention

The present invention is directed to a system for producing diverse visual presentations based upon computer output information, in particular, printed output of diverse copies having different content. Specifically, traditional single or multipart forms are produced on an image-representation device from diverse input data streams independent of any device-dependent characteristics embedded in such input data streams.

B. Background Art

Production of form documents in the business environment usually involves the specification of form "art work," the number of copies or parts, spot carbon areas, the physical paper characteristics such as type and size. Such specification and subsequent production are time consuming and expensive. Further, the competition of forms requires that an application program preformat its output to match the prepared form. As a result, any change in the form requires a corresponding change in the application program—an expensive process. Additional difficulties may be encountered in exact data format and paper registration within the printer for even the most basic paper form document generation.

Traditionally, for basic paper form generation, application programs which produced output on a preprinted form were required to read a data record, identify and select the data field appropriately, and format the fields. When writing these application programs, the programmer was required to specify in tedious detail the exact placement of each data field by adding padding spaces, horizontal tabulation, and other formatting controls so that information-containing fields were actually printed within the appropriate areas on the preprinted forms. If multipart forms were desired, full carbons or spot carbons were placed between sheets to enable printing a data field to register on a plurality of sheets. If certain data fields were to appear on some sheets but not on others, the sheets on which the data field was not to appear required no carbon in the fields where the data field to be suppressed was printed on other sheets.

For example, if the multipart form document being printed was a traditional U.S. W-2 Income Tax Form, the amount of state and local tax which appeared in certain locations on some sheets of the form should not appear on the copy sent to the U.S. Government. Therefore, the sheet of carbon paper facing the sheet sent to the U.S. Government had no carbon facing these state and local tax locations. When the printer struck these carbonless locations, the printing of state and local tax data was suppressed from the U.S. Government's copy.

With the advent of computers having more sophisticated print facilities, the data transmitted to the printer no longer had to be fully formatted by the application program. Utility programs were developed which took over part of the task of formatting printer output and, therefore, the information which was conveyed by the application program became somewhat more skeletal. The application program was required to send only the appropriate fields in the correct order, and the utility would then combine the field information with a certain amount of printer information in a structure called a "form control block" or "form control buffer" (FCB). This FCB was a memory area for the assembly of a complete page of printer information. The fields sent by the applications program were placed in the appropriate locations within the FCB by the utility program. Once completed, the FCB was sent serially to the printer for output.

Later, non-impact printers were developed. These included ink jet, laser electrographic, electrodischarge, and thermal printers. It was not feasible to use preprinted multipart forms which employed spot carbon to suppress certain fields on some copies but not others using these non-impact printers. The lack of an impact meant that the form had to be printed several times in order to achieve an equivalent product. Because of this, the application program was required to transmit multiple copies of the same data incorporating the fields which were desired and deleting the fields which were to be suppressed for a given copy. It became apparent that the use of preprinted forms in this environment was not economical.

Additionally, preprinted forms required exact forms registration within the print mechanism in order that information fit within predefined areas of those forms. This forms registration requirement added complexity to an already difficult task in that paper alignment had to be maintained manually by an operator or automatically by additional expensive and complicated hardware. Thus, an alternative to the preprinted form was developed. This alternative was termed the "forms flash".

In a laser electrographic printer, a forms flash is composed of a negative plate which is physically placed within the printer and is illuminated by a xenon flash lamp during the scan of the drum or plate by the laser. This forms flash allowed the creation of a preprinted form and simultaneous fill-in of the form by the laser. This technique, however, suffered from the inherent limitation of the physical processes required to mount a negative plate in the printer. During the mounting and dismounting process the printer could not print. This lowered the printer output and increased printing costs.

The form plate, once mounted, may not be varied to suit the application, it may only be turned on or off.

It was discovered that a more efficient way of creating the form was to create an electronic overlay of the form in the FCB. The form was OR'ed with the information fields in the memory map of the FCB to arrive at a final document. This procedure involved determinating which memory locations in the FCB corresponded to an area of the form and overlaying in that memory location whatever character appeared at that area of the form. This provided the added benefit of allowing forms to change during processing using software to alter the contents of the FCB. The advantage of this approach was that it eliminated the need to have several form negatives with minor variations among them. This procedure also eliminated the time-consuming and expensive process of physically storing, mounting and removing the form negatives since the FCB overlays could be stored in electronic memory.

Pending U.S. Pat. application Ser. No. 345,943 filed Jan. 29, 1982, entitled "A Page Modification Method in a Printer Subsystem of the Partial Buffer Composing Type" and issued as Patent 4,470,129 to Disbrow et al. shows printer action based on a host program with regard to PAGEDEF and FORMDEF which are hereinafter fully described. U.S. Pat. No. 4,470,129 is assigned to the same assignee as this application and is incorporated herein by reference.

U.S. Pat. No. 3,959,776 to Morley teaches the construction of a programmable printer. This printer contains a microprocessor-controlled data interface which can select data information from both external sources and an internal store maintained in programmable read-only memory. The device is constructed to allow intermixing of external variable data information and internal stored fixed data information for the generation of output information in a specific predefined format.

Memory overlay of forms onto the FCB also created the possibility of combining multiple forms on the same output document. This combination could be performed by software mapping algorithms. It could not be performed in a forms flash system without creating a specific negative for each combination desired.

U.S. Pat. No. 4,031,519 to Findley discloses a printer having an internal instruction execution unit controlled by a channel connected to a data processing unit. The instruction execution unit derives its data and control sequences from both read-only storage and a writable control storage area. The instruction execution unit in turn controls a laser imaging apparatus. Writable storage includes buffers for information to be printed as well as instructions for the modifications of that information within the printer.

With the advent of forms combination, it became apparent that the overlays used to create preprinted forms should constitute a system level resource. Other system level resources included character fonts or type styles, segments, and suppressions.

By using the character font resource, an applications program could specify different type styles at various locations within a document. Two types of segments were available. The first type of segment included pieces of final image or copy which were repeated so often as to become inefficient to retransmit each time they were used. For example, contract or sales form boilerplate could be defined as segments. Another type of segment is a logotype or a small figure which was too large to fit within a font definition. Another resource was a suppression. A suppression was a modern day equivalent of the spot carbon form. It was a way to remove information from certain copies of a multipart printout.

U.S. Pat. No. 4,300,206 to Belleson, et al. describes a printer having a microprocessor-controlled raster imaging apparatus. The printer contains an accumulator memory for the logical OR'ing of data bits which may include raster-coded graphics and text.

An IBM 370 system CPU (host computer) ordinarily communicates with a visual display hard copy device over an input/output channel. Such a channel is conventionally composed of a slave CPU and various pieces of adapted electronics. In addition, many printers contain data and program memories and internal CPU's generally termed instruction execution units (IEU). System 370 I/O channels are controlled by the 370 CPU via channel command words (CCW's) which instruct the channel processor in its data transmission activity.

Data transmitted over a channel to a visual display hard copy device ordinarily contain control information for that device in the form of carriage controls, or CC's, which preface a given amount of text-representing information. These CC's typically include commands for spacing, skipping to a given channel, folding and unfolding of paper, controlling paper and mechanical actions such as cover opening or paper loading, and self-diagnosis of the mechanism. Such CC's are composed of specific values for a given printer device, and such values activate specific instructions within the printer.

Typically, a block of information to be printed contains the appropriate CC's inserted there by the user of a systems level utility for print formatting.

C. IBM 3800 Model 3 Printing Subsystem

C. An IBM 3800 Model 3 Printing Subsystem (announced 1982) uses a low-power laser and an electrophotographic process to generate printed output. A photoconductor is used with electrical properties that change when it is exposed to light, and a laser subassembly scans data images onto the photoconductor. The photoconductor is wrapped around the surface of a drum. Toner is attracted to the areas on the photoconductor.

The scan lines of data are created two lines at a time, and the resulting bit patterns are used as impulses that modulate a laser beam in the laser subassembly. Where the raster patterns indicate a dot, the laser beam is directed through an optical system to the photoconductor, which has been electrically charged by a charge corona. The charged areas on the photoconductor that have been exposed to the laser beam are discharged, forming electrostatic images that are suitable for development.

After the images are transferred to the paper, the photoconductor passes through a cleaner station, where it is cleaned and reconditioned for the next exposure, then through the charge corona, where it is charged again.

The use of a laser beam directed through an optical system to implement raster patterns allows the use of all-point addressability. This printing concept allows users to produce text, electronic forms, and images at any defined point in the printable area of a sheet. These points, called print elements (pels), may have a density of $240 \times 240$ pels per square inch.

The printing subsystem operates in two basic modes: page mode and the compatibility mode. The page mode may be used to implement all-points addressability, line generation, electronic overlays, images, and text orientation. Line generations may include solid or dashed lines. These lines may start from any defined point on the page and may have any defined length either in a horizontal or vertical direction. The types of overlays permitted include lines, boxes, shaded areas, constant text, and images such as signatures or logos. The images may be drawings, graphics or logos. Both portrait and landscape orientations are permitted. In portrait orientation the printed image is vertical along the long side of the sheet or form. In landscape orientation the printed image is vertical along the short side of the sheet or form.

The compatibility mode permits the 3800 Model 3 to emulate the 3800 Model 1 Printing Subsystem to produce output with application programs for the Model 1 with little or no change. The applications data and formatting specifications of the Model 1 have been required to be introduced sequentially on a line-by-line basis. While sequential specification of the compatibility mode is no longer required in the page mode, data specified in this format may be converted by practicing the present invention to all-points addressable format.

Generally, however, the laser assembly scans data images onto the photoconductor. Toner is attracted to the areas on the photoconductor that have been exposed to light from the laser. Paper is then passed over the surface of the photoconductor causing toner to be transferred to the paper. If a flash overlay is to be done, the photoconductor is exposed using the forms flash unit consisting of a film negative and a xenon flash lamp. A control, passes light through the film negative exposing its image onto the photoconductor.

Further information pertaining to the IBM 3800 Printing Subsystems and related support systems is available in the IBM Publications GA32-0049-0, "Introducing the IBM 3800 Printing Subsystem Model 3," GA32-0050-1, "Reference Manual for the IBM 3800 Printing Subsystem Model 3," and GH20-9158-2, "Document Composition Facility and Document Library Facility General Information," which are incorporated herein by reference.

SUMMARY OF THE INVENTION

A system and method for creating a visual display of data from an input data set in which the data are not fixed into display acceptable format until the data are stored in a local memory of the visual display. First, at least one of a plurality of sources of resource information is selected as required by the input data set to effect the visual display. Visual presentation control signals are then embedded into the input data set corresponding to the selective sources of resource information and in this manner form an output data set. The selected sources of resource information and the output data set are then applied to the local memory from which they are jointly taken to produce the visual display. It is in this manner that there is a delay in the decision to fix the data into display-acceptable format until just prior to the actual display, rather than during execution of the application program or system utility program as was done in prior systems.

The foregoing and other features and advantages of the invention will be apparent from the following, more particular description of a preferred embodiment of the invention, as illustrated in the accompanying drawings.

DETAILED DESCRIPTION OF THE INVENTION

Figure 1:
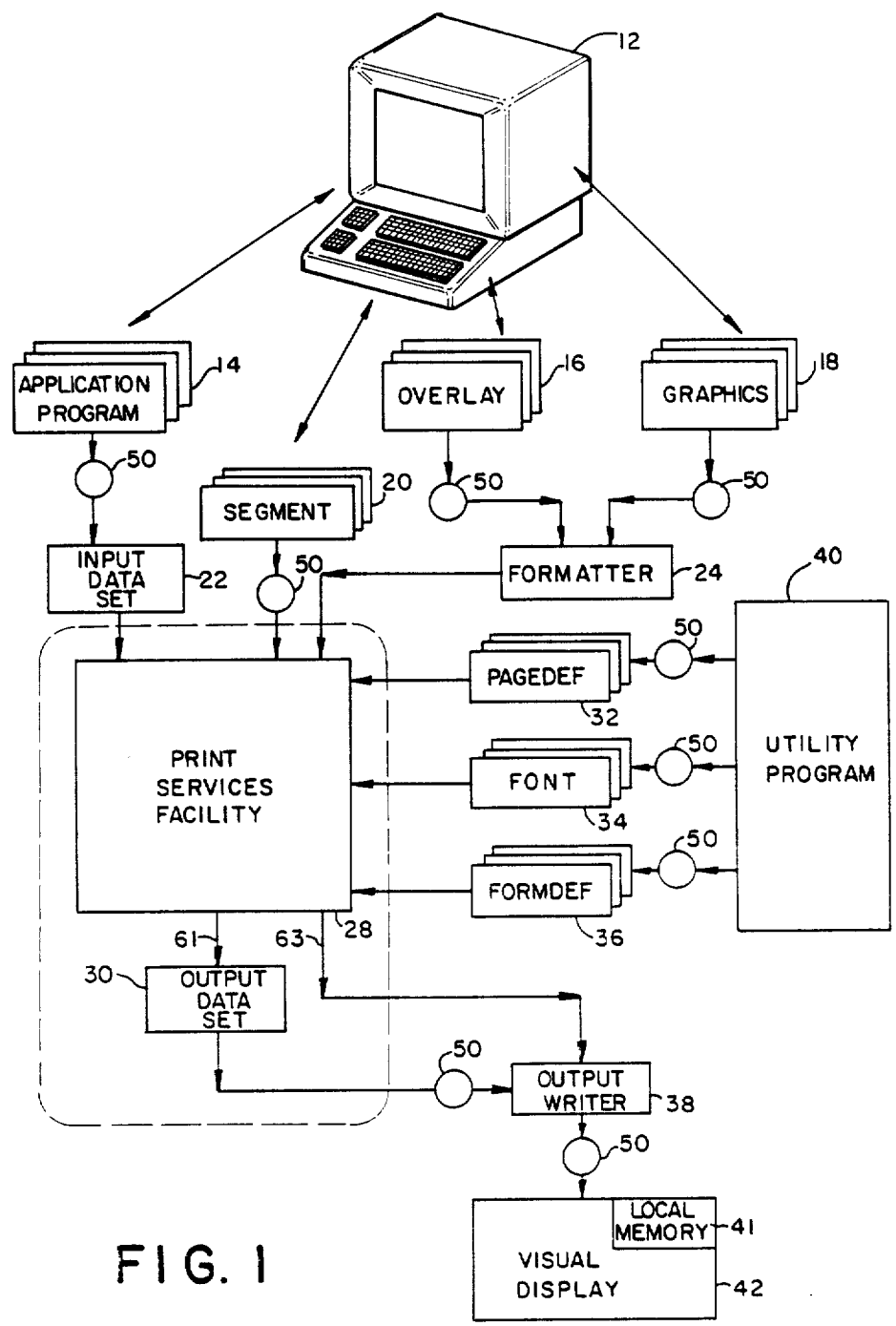
FIG. 1 depicts the overall system of the present invention in a basic block structure.

Referring now to FIG. 1, there is shown a system block diagram of a visual display system in which it is possible to extend the time at which data to be visually displayed are fixed in display equipment acceptable format, allowing a greater amount of flexibility in the visual presentation of data. The print services facility 28 (PSF) is software which executes upon a conventional host computer such as an IBM-370 System. PSF 28 fixes data for a visual display by visual display unit 42 at a point much later in the overall display process than during execution of application program 14 of the host computer.

Heretofore, application data processing programs were required to format data on a sequential, line-by-line basis. Under the present invention, the application program need merely point to a block of information in order to have that information processed for visual display.

Application program 14 creates input data set 22 (IDS). PSF 28 formats input data set 22 by accessing direct access storage device 50 (DASD) to retrieve input data set 22 and various system resources including segments 20, overlays 16, graphics 18, and fonts 34, under the direction of PAGEDEF 32 and FORMDEF 36. For purposes of clarity, it should be noted that the direct access storage device 50 is a mass storage memory and, although referenced herein by a common reference numeral 50, it may comprise a plurality of storage devices.

Figure 6:
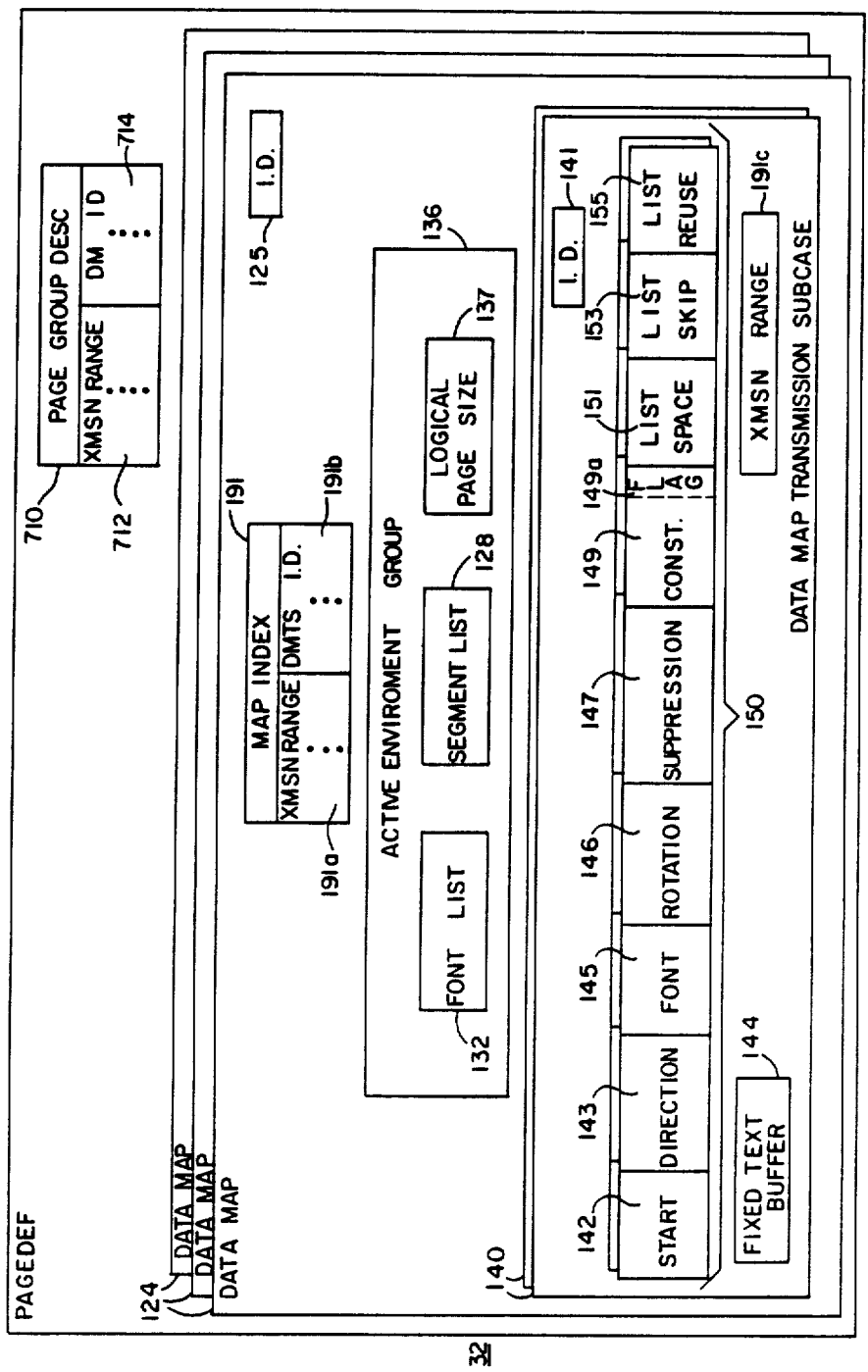
FIG. 6 depicts the structure of the PAGEDEF file.

Each PAGEDEF 32 is a page definition file through which the formatting of lines on a logical page of output is specified. This page definition file is external to the application program and to PSF 28. PAGEDEF 32 is created by utility program 40 and placed on DASD 50 for later use by PSF 28. PAGEDEF 32 is composed of one or more data maps 124 which contain line descriptors 150 as shown in FIG. 6. Data maps 124 and line descriptors 150 are used for interpreting line data in IDS 22, embedding text controls indicative of system resource usage into output data set 30, and mapping individual data records of line data into output pages of output data set 30.

Each FORMDEF 36 is a form definition file through which the identities of various systems resources required for output data set 30 are specified. FORMDEF 36 also specifies the overall format of output data set 30. It is useful to distinguish carefully between "pages" and "forms" as defined in the Glossary. Additionally, it is important to distinguish between the data structures (pages and forms) and the physical results of the visual display process. For example, an actual physical page may contain a plurality of logical pages. FORMDEF 36 is also external to the application program and to PSF 28. It is created by utility program 40 and placed on DASD 50 for access by PSF 28 when constructing output data set 30.

Using one or a plurality of PAGEDEF's 32 and/or one or a plurality of FORMDEF's 36 it is possible to effect dynamic changing of the visual display produced by visual display device 42. These changes occur in the host computer prior to the generation of the output data set 30 to be supplied to visual display device 42, rather than in application program 14. An output data set 30, stored in local memory 41 of visual display 42, may be successively displayed with different overlays 16, segments 20, fonts 34 and with different portions suppressed during the various presentations. This dynamic changing is possible because many selectable PAGEDEF's 32 and FORMDEF's 36 are available on DASD 50, and because different environments may be specified within a PAGEDEF 32 and/or within a FORMDEF 36. By selecting different PAGEDEF's 32 and FORMDEF's 36 from DASD 50, different environments within an active PAGEDEF 32 or FORMDEF 36, or different subcases 140, very different visual displays selectively having differing informational content may be produced for the same output data set 30.

Application program 14 and the software of PSF 28 are stored and executed in the main memory of the host computer for which visual display 42 is an output device. Input data set 22 is the output of application program 14 and is stored in a distinct area of DASD 50. Likewise, each PAGEDEF 32 and each FORMDEF 36 is stored on distinct areas of DASD 50. Thus, PAGEDEF 32 and FORMDEF 36 are external objects with respect to application program 14, input data set 22, PSF 28, and the software of PSF 28. The appropriate FORMDEF 36 for a particular input data set 22 from an application program 14 is called up by the job control language (JCL) which is used with application program 14 or over a network. Thus, different visual displays may be produced for that input data set 22 by specifying different FORMDEF's 36 in the JCL. Alternatively, PAGEDEF 32 and FORMDEF 36 may be invoked as a system resource rather than by JCL statements.

The various system resources, as seen in FIG. 1, include segments 20, overlays 16, graphics 18, fonts 34, FORMDEF 36, and PAGEDEF 32. All system resources are also external to application program 14, input data set 22, PSF 28 and the software of PSF 28. Segments 20 are pieces of final image or copy, such as repetitive information, which are repeated so often as to become inefficient to retransmit each time they are required for display. These segments 20 are given segment names and stored on DASD 50. Overlays 16 perform a role similar to that of the forms flash. They are created by coding an "overlay definition" using input-/output device 12. The result is a stored definition of a blank form which may be printed simultaneously with variable data produced by application program 14. A human operator may also use input/output device 12 to create graphics 18. Both overlays 16 and graphics 18 are stored on DASD 50 and are processed and formatted by formatter 24 prior to use by PSF 28. Fonts 34 are definitions of characters which may be created interactively on a CRT screen using utility program 40.

PSF 28 embeds into the data stream, obtained from IDS 22, text controls which represent the system resources required to produce finished documents on visual display 42. The resulting output data stream, in the form of output data set 30, is transmitted to local memory 41 from PSF 28 via logical channel 61. The system resources, which correspond to the embedded text controls, are transmitted to local memory 41 via a separate logical resources channel 63 for subsequent processing and merging with other text and graphics data within visual display 42 after the changes are implemented in the host computer. The merging of data from channel 61 and resources from channel 63 in local memory 41, termed inclusion control, and the fixing of the form of final visual display documents, occur at the last stage before visual display rather than during execution of application program 14. This merging at the last stage before visual display permits dynamic changing of the visual presentation. The same data or selected portions of such data from an application program 14 may be merged with different system resources to produce different visual presentations.

After construction of output data set 30 by PSF 28, output writer 38 is executed. Output writer 38 is system software which controls the host computer input/output channel using channel command words (CCW's) in order to effect display on visual display 42.

Visual display 42 may be an all-points addressable, laser electrographic printer with local subsystem memory. Visual display 42 includes a local memory 41 and is capable of performing overlays and forms flashes and may be an IBM 3800 Model 3 printing subsystem, previously described.

Figure 2:
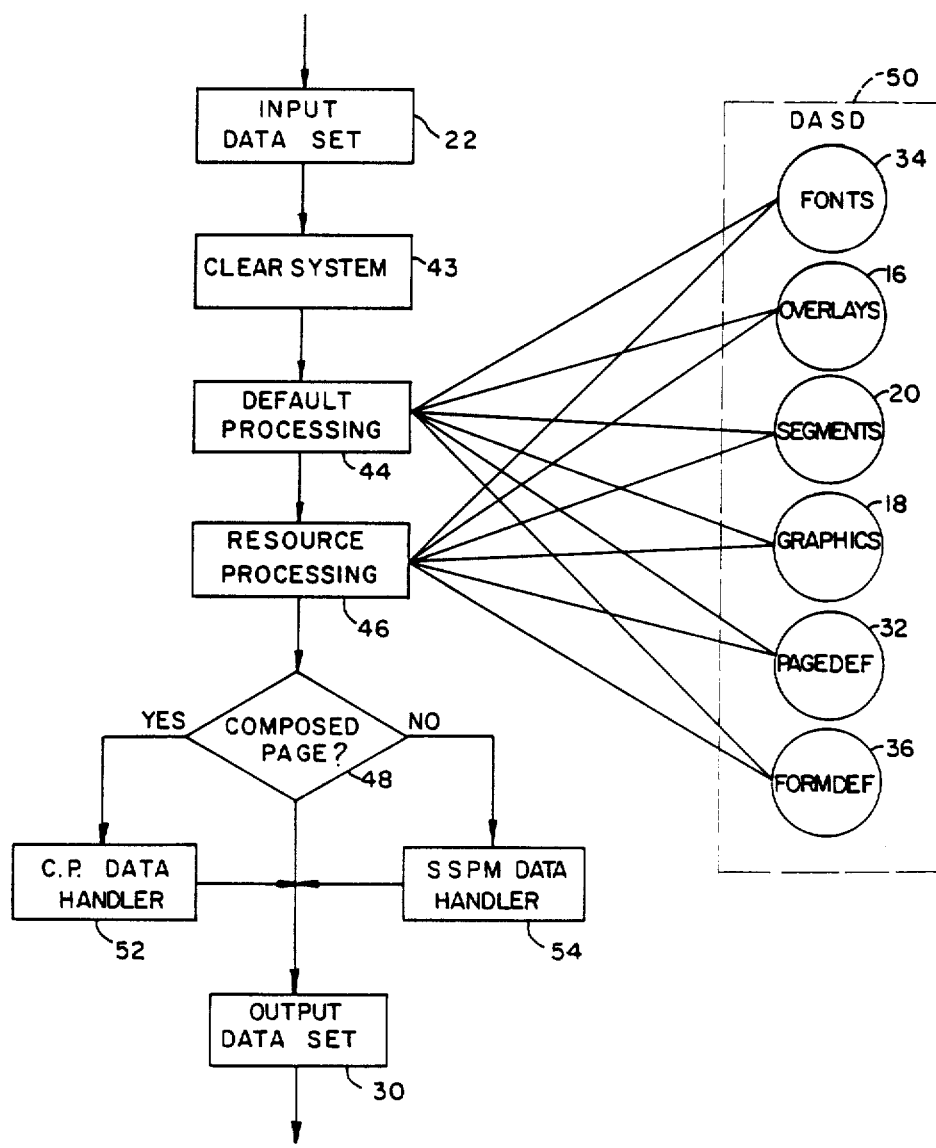
FIG. 2 illustrates the structure of Print Services Facility in greater detail.

FIG. 2 is a high level, logical diagram of the processes which occur with the PSF 28 when input data set 22 is processed to produce output data set 30. Visual display unit 42 contains a large amount of local subsystem memory 41. A first operation which must be performed, as seen in block 43 of FIG. 2, is the clearing of this local memory 41 to remove pointers and other information which may remain after completion of a prior visual display task. In block 44 of FIG. 2, default conditions for visual display are established using default FORMDEF 36 and PAGEDEF 32 files in order to determine those resources used in output data set 30. Defaults are established to allow processing of an input data set which does not request specific resources. For example, if input data set 22 does not specify a particular font, the default font for the system is used. This default font would, therefore, be specified in block 44.

In block 46 of FIG. 2, resources processing occurs. The movement of resources to the local memory 41 of visual display 42, which occurs in block 46, is handled over a logical resource channel 63 as shown in FIG. 1. In this step, a resource manager within PSF 28 overrides any defaults established in default processing block 44 when required to do so by specifications contained in PAGEDEF 32, FORMDEF 36, or IDS 22. As seen in FIG. 2, the processing which takes place in blocks 44 and 46 both require access to DASD 50 in order to obtain the systems resources shown: fonts 34, overlays 16, segments 20, and graphics 18. In addition, these processes must also access PAGEDEF 32 and FORMDEF 36 stored on DASD 50.

Input data set 22 may contain a plurality of records which, along with various system resources, are formatted and combined by print services facility 28. These records may be divided into two categories: those that are in conventional line data format and those that are already in a composed page data set format (CPDS). CPDS format is a format which is appropriate for all-points addressable display. It comprises composed page data surrounded by certain control characters and includes additional control characters corresponding to system resources. Line data format input data sets are produced by application programs having output destined for line printers, such as many programs written prior to the present invention. Those input data sets from application programs written to be compatible with the all-points addressable display are already in the CPDS format for composed pages.

Decision diamond 48 makes the determination of input data set type. For the data which are in CPDS composed page form, execution proceeds using CPDS data handler 52. If, however, input data set 22 is in conventional line data format, SSPM data handler 54 is executed. SSPM is the system printing manager. It appears at the end of this specification as Appendix A and is written in a structured format understandable by those of ordinary skill in the art. Appendix A includes an overview of the system printing manager as well as flow charts showing the process control flow and the macros and modules of the system printing manager. The system printing manager, as set forth in Appendix A, comprises four modules: INIT, DMI, UPI and SPM. INIT initializes system printing manager control blocks and tables. DMI builds data map transmission buffers from line descriptors and fixed data test structured fields as will be described later. UPI builds suppression ID's. SPM performs the main processing of line, unformatted records and some special page mode data records. A pseudocode listing for each module is shown at page 36, 37, 40 and 42 of Appendix A respectively. Additionally control flows for individual modules are shown at page 5, 6, 7 and 24 of Appendix A. It is in SSPM data handler 54 that line data are converted to composed page data. The received line data may include some data having a format already compatible with CPDS composed page data, as will become apparent. This mixture of line data and CPDS format is termed "mixed mode". In both case, an output data set 30 is produced. When mixed mode is encountered, SSPM data handler 54 separately processes the CPDS format records in a line mode page. The term systems printing data refers to data which are pure line data and to data sets which contain this mixture.

Figure 3:
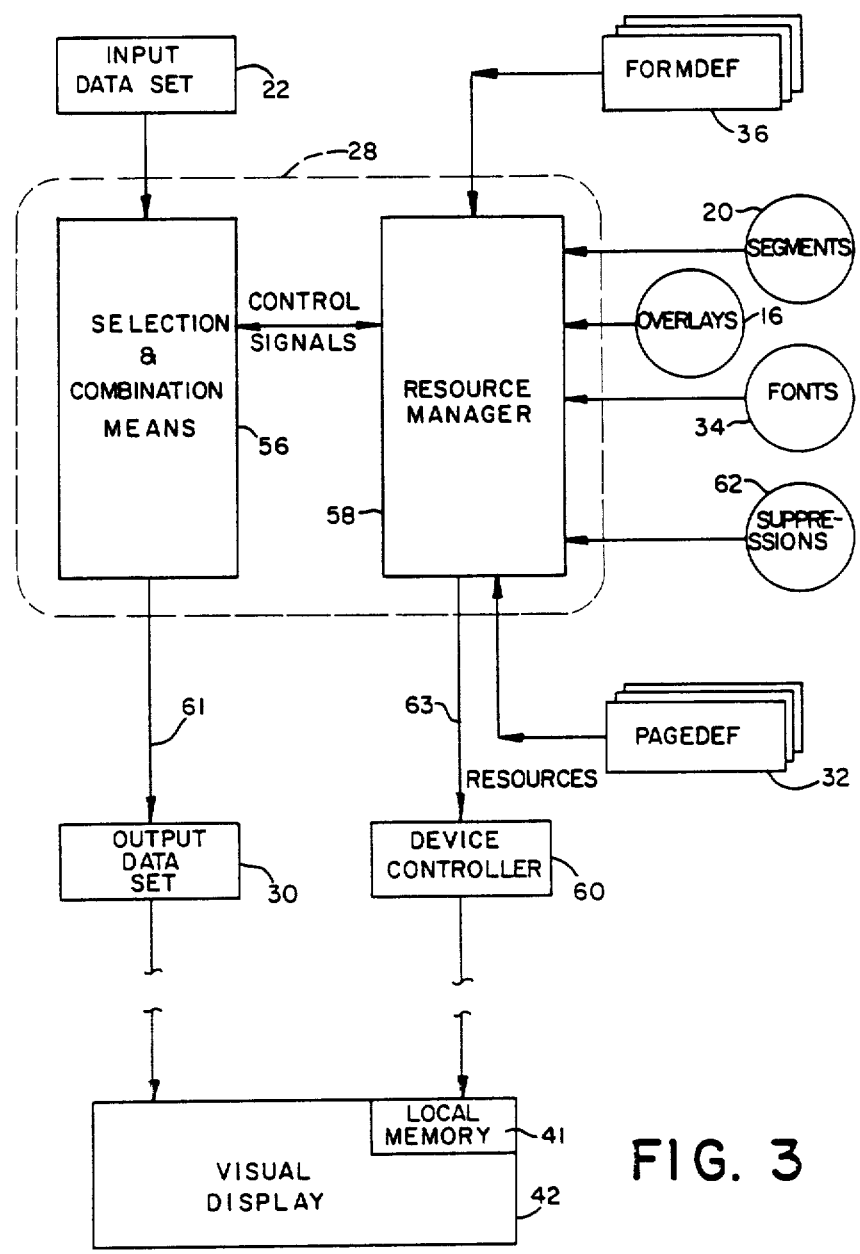
FIG. 3 illustrates the control structures within Print Services Facility.

As seen in FIG. 3, PSF 28 contains selection and combination means 56 and resources manager 58. Selection and combination means 56 receives input data set 22 and merges into it inclusion control signals (referred to as text controls which may be channel command words or presentation-control signals) received from resource manager 58. Text controls are signals which occur within a record 68. Resource manager 58 receives from selection and combination means 56 the names of the resources required by input data set 22. Resource manager 58 then examines the list of resources currently resident in the memory of visual display 42. If the resource requested is not currently resident within the memory of visual display 42, resource manager 58 retrieves it from DASD 50. It then communicates to selection and combination means 56 a text control corresponding to that resource and transmits that resource to device controller 60 using logical resource channel 63.

Combination and selection means 56 embeds the text control received from resource manager 58 into input data set 22 and thereby constructs output data set 30. The internal structure of output data set 30 is, therefore, a series of signals representative of text and resources to be included. When complete, output data set 30 is transmitted to visual display 42 via channel 61.

As previously described, it is possible to have different portions of output data set 30 suppressed on different copies produced by visual display 42. This selective suppression of data is performed by visual display 42 under the direction of FORMDEF 36 and either PAGEDEF 32 or application program 14. FORMDEF 36 controls which copies of output contain the d data and which copies have the data suppressed. However, in order to be a candidate for suppression under the control of FORMDEF 36, a data item must first be primed by either PAGEDEF 32 or application program 14. This represents the equivalent of a logical AND operation in which suppression occurs only if FORMDEF 36 directs the suppression and the data item being suppressed was previously primed for suppression. To prime a data item for suppression, the suppression is given a name and the data item is bracketed with that name. A whole page may be primed for suppression by bracketing it with a suppression name. If a FORMDEF 36 directs the suppression of such a page, a blank page is provided.

Whether the information to be suppressed is primed by PAGEDEF 32 or by application program 14 depends on whether application program 14 was written to be compatible with the all-points addressable printer and is, therefore, already in CPDS form or to be compatible with a conventional line mode printer. If application program 14 was written to be compatible with an all-points addressable printer, the input data set 22 contains primed candidates for suppression before application to PSF 28. If application program 14 produces an input data set 22 containing conventional line mode data, the priming of the data to be suppressed occurs under the direction of PAGEDEF 32 while the data are being processed by PSF 28.

In either case, priming the data comprises bracketing them with characters which are interpreted by visual display 42 as indicating the beginning and end of the suppression. These bracketed data are included in output data set 30 along with data which are not primed for suppression. When the bracketed data are encountered by visual display 42, a determination is made under the control of FORMDEF 36 whether the data are to appear on the copy currently being produced.

Figure 4:
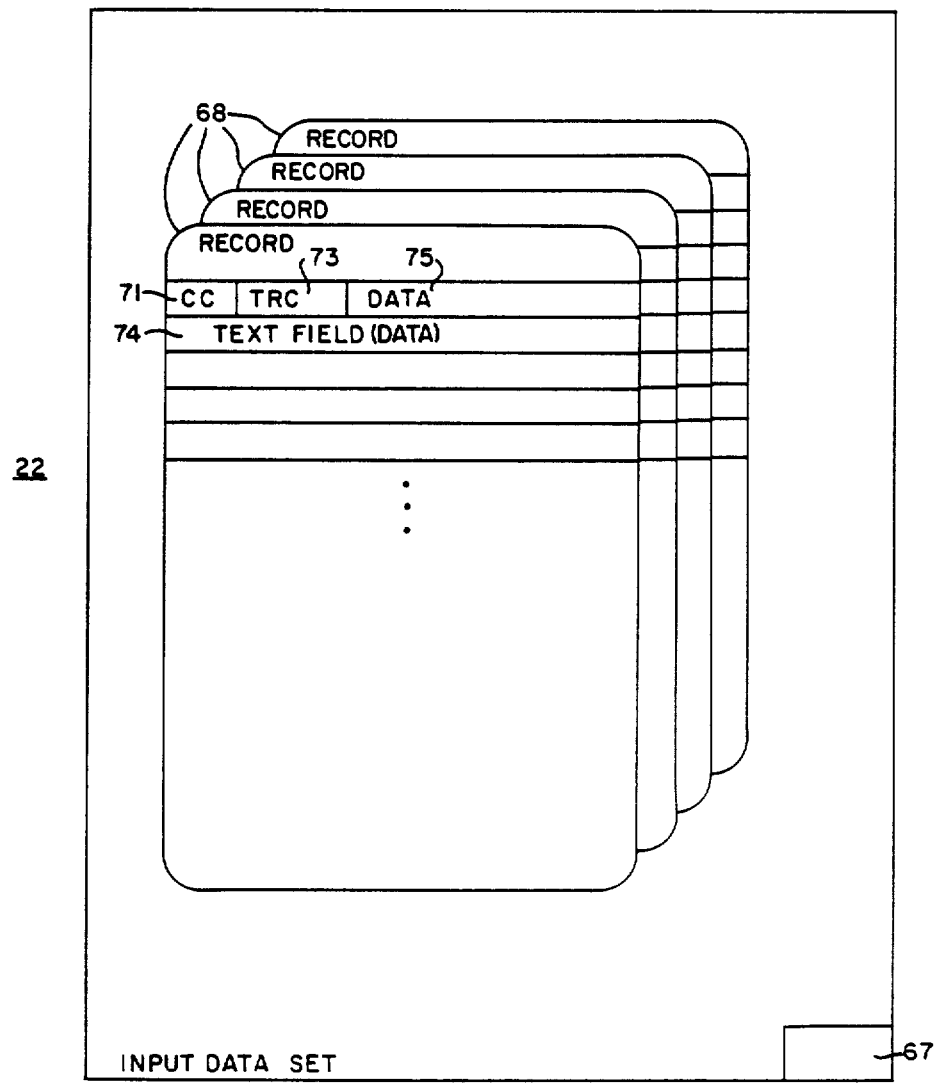
FIG. 4 details the format for Input Data Sets.

Referring now to FIG. 4, an input data set 22 is shown. As seen in FIG. 1, input data set 22 is produced by application program 14 and processed by PSF 28 under the control of PAGEDEF 32 and/or FORMDEF 36 to construct output data set 30. Input data set 22 contains a plurality of records 68 received in the order in which they are outputted by application program 14.

An input data set 22 having conventional line mode only contains records 68 which begin with a carriage control 71. Additionally, record 68 may have a Table of Reference Characters 73 which is used in the process of selecting fonts 34. Additionally, record 68 has data 75 which contains a plurality of text fields 74. Text fields 74 contain only text. The input data set shown in FIG. 4 is a model of the data set produced when conventional line mode data are output from application program 14. This figure is, of course, not applicable to input data sets already in CPDS format.

Figure 5:
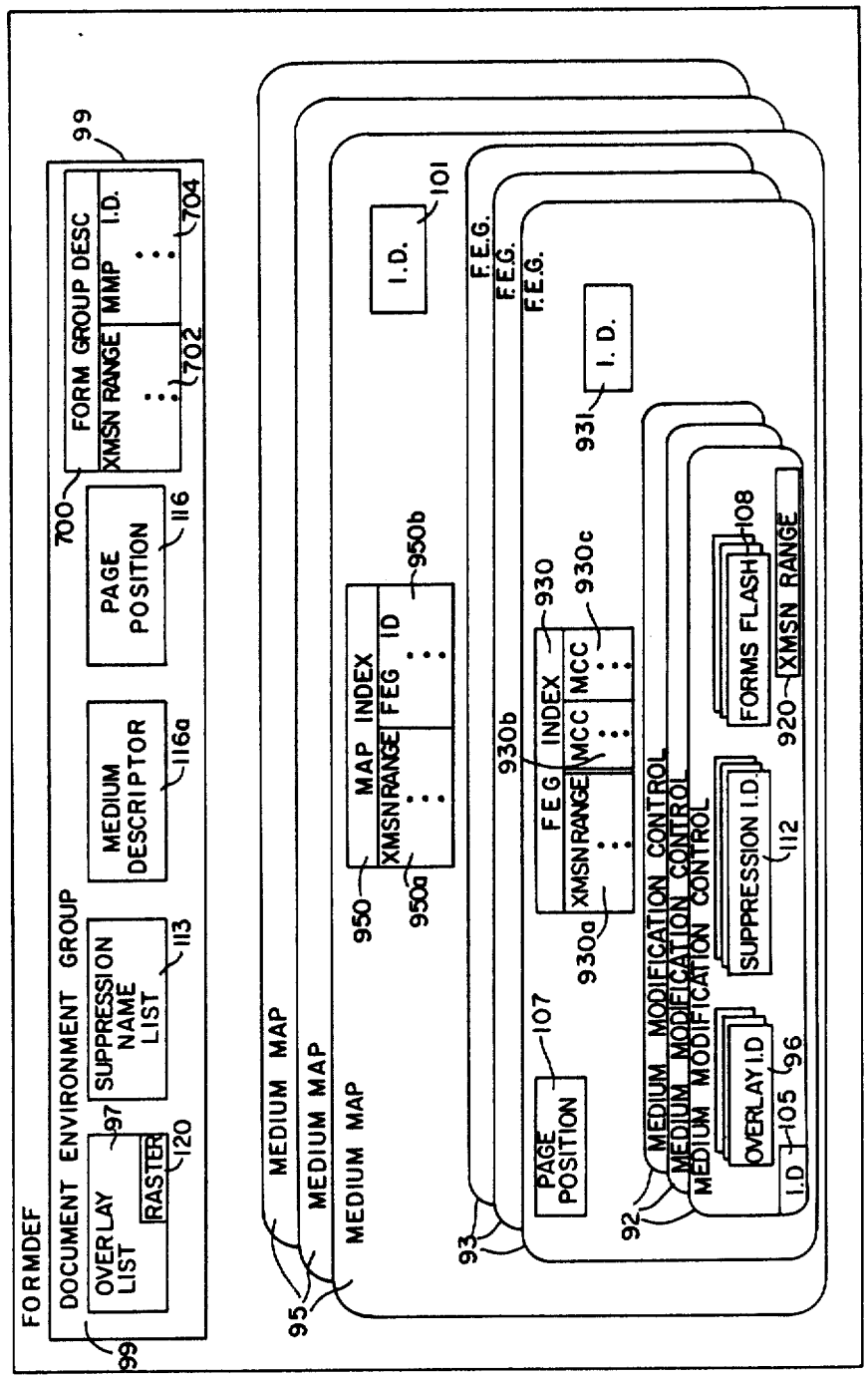
FIG. 5 depicts the structure of the FORMDEF file.

Referring now to FIG. 5, FORMDEF 36 is seen as a form definition file used to specify the number of copies to be made of the data contained in an input data set 22 and the modifications to be made on each copy. A FORMDEF 36 may be used to make multiple copies of a page from a single page of data, with each copy modified using various system resources. These multiple copies, under the control of a single FORMDEF 36, comprise a copy group. Each medium modification control 92, as shown in FIG. 5, controls the format of a logical page and may contain specifications for a plurality of copies of the logical page, as identified in medium copy control 930b.

Within each medium modification control 92 is a plurality of overlay I.D.'s 96, a plurality of suppression I.D.'s 112, and forms flash 108. Each overlay I.D. 96 specifies the name of one of a plurality of overlays which may be used for the logical page controlled by medium modification control 92. Suppression I.D. 112 indicates the names of suppressions which are activated in a copy group. The sections of text previously primed for suppression by bracketing them with their respective suppression name are suppressed at visual display 42 for the copies which are produced using a given medium modification control 92. These sections of text may be primed in application program 14 if application program 14 were written to be compatible with the all-points addressable printer and to produce an input data set 22 in CPDS format. If application program 14 produces an input data set 22 containing conventional line mode data, the data to be suppressed are located and primed under the control of a PAGEDEF 32. In either case, the data to be suppressed are primed by bracketing with the appropriate control characters. Suppression I.D.'s 112 contain the control information to determine whether such bracketed information is to appear or to be suppressed on the copy or copies controlled by the current medium modification control 92. In order for suppression by suppression I.D. 112 to be effective, the data to be suppressed must be primed for suppression.

Forms flash 108 is a software switch which enables or disables the xenon flash within visual display 42 when the form is produced. Page position 107 indicates the horizontal and vertical position of the logical page produced under the control of medium modification control 92 on the physical page. Medium modification control 92, page position 107, and FEG index 930 determine the form of the document produced and constitute a form environment group 93.

Normally, there is one form environment group 93 per medium map 95. However, the ability to include a plurality of form environment groups 93 within a medium map 95 allows electronic collation of sets of forms with various modifications among them. For example, it may be desired to produce five copies of an output that is four pages long. Rather than producing five copies of the first page, five copies of the second page, etc., it is possible to produce pages one through four five times with each set having the modifications particular to it. This is accomplished by transmitting output data set 30 five times with each transmission keyed to one of five different form environment groups 93, each form environment group 93 defining the modifications on its set.

The transmissions are sequentially controlled by the form environment groups 93 with, for example, the first transmission being controlled by a first form environment group 93, the second transmission being controlled by a second form environment group 93, etc. Alternatively, more than one transmission may be controlled by the same form environment group 93. The differences among the five sets are implemented by specifying different overlay I.D.'s 96, suppression I.D.'s 112 and forms flash 108 within the appropriate form environment groups 93. In order to support this function, therefore, a plurality of form environment groups 93 is required with each group 93 corresponding to an appropriate sequential transmission of output data set 30. If there is no active form environment group, the whole page is skipped and no sheet of paper is produced.

The plurality of medium maps 95 within FORMDEF 36 enables dynamic changing of the formatting of documents. Output data set 30 is transmitted to local memory 41 of visual display device 42. In visual display 42 it is fixed into a final display format using various selectable overlays 16, suppressions, etc., specified within a medium map 95 which identifies a form to be used. This allows the same data set to be printed in various formats using the same output data set 30 and FORMDEF 36. Each different format produced by visual display 42 for subsequent transmission of the same output data set 30 may be specified by a corresponding form environment group 93 within medium map 95. Alternately, several variations of output data set 30 may be transmitted and controlled by the same medium map 95.

In order to assist in this specification of a corresponding medium map 95, document environment group 99 contains form group description table 700. This table 700 contains two lists: a transmission number range list 702 and a medium map I.D. list 704. It is possible to determine the appropriate medium map 95 for each subsequent transmission by locating the transmission number within a range in list 702 and choosing the corresponding entry in list 704. The corresponding entry in list 704 is a medium map I.D. 101 which identifies the appropriate medium map 95.

Similarly, each medium map 95 contains a plurality of form environment groups 93. A form environment group 93 may be selected by comparing the active transmission number to the transmission number range list 950a contained within map index 950 to select a form environment group I.D. from form environment group I.D. list 950b. The I.D.'s found in list 950b correspond to I.D. 931 within each form environment group 93.

Having selected one of a plurality of form environment groups, further refinements in formatting information may be selected according to the information contained in FEG Index 930. By comparing the transmission number range contained at 930a with the active transmission number, an entry in the medium copy control list 930b and/or medium modification control I.D. list 930c may be indicated. Medium modification controls 92 may be selected in this manner by their I.D.'s 105. Alternatively, medium modification controls 92 may be selected by a comparison of the active transmission number with a transmission range embedded within medium modification controls 92 at transmission range 920.

By employing a hierarchical structure of indices and identifiers, a plurality of differing visual displays may be created using a single FORMDEF 36. It will be understood by one skilled at computer programming, that any combination of indices and identifiers may be employed to effect proper selection of FORMDEF components such as medium maps, FEG's, and medium modification controls.

As an illustrative example, consider a Tax Form. When this document is prepared for employees who reside in New York City there must be a New York city W-2, a New York State W-2, and a U.S. Government W-2 for the corresponding local tax, state tax and Federal tax. The production of these forms may be implemented using a single medium map 95 with a single form environment group 93 and three medium modification controls 92 within the form environment group 93. Each medium modification control 92 corresponds to one of the three W-2 forms and has slightly different overlays and suppressions, since each W-2 must have the appropriate identifying language and some W-2 forms contain data not contained in others. Since two copies of each W-2 form are required, medium copy control 930b will specify two for each medium modification control 92.

However, employees who are residents of the State of New Jersey may not require New York W-2 forms. For these employees, a second medium map 95 may be employed, the second medium map 95 containing a single form environment group 93 which does not contain medium modification control 92 corresponding to the New York City W-2 form. Thus, there is a first medium map 95 with medium map I.D. 101 corresponding to employees who are residents of New York State, having three medium modification controls 92, and a second medium map 95 with its corresponding medium map I.D. for employees of the State of New Jersey, this second medium map 95 having only two medium modification controls 92. In order to invoke the different medium map I.D.'s 101, the user places an invoke medium map structured field record into the line data of input data set 22 and names the medium map desired. This is required because current JCL only permits specification of the FORMDEF 36 itself as an external object, not the internal elements of FORMDEF 36. An invoke medium map may select internal elements of FORMDEF 36.

Only one invoke medium map is permitted per page. The invoke medium map may occur between pages for systems printing data. When this occurs the medium map 95 invoked is used on all pages until a new medium map 95 is invoked. If there is a CPDS record in systems printing data, the invoked medium map 95 covers that CPDS record. However, any CPDS pages which occur in the systems printing data are controlled by their own internal invoke medium maps. Following records in line mode are again subject to invoked medium map 95.

Again turning to FIG. 5, each FORMDEF 36 has an overlay list 97. Overlay list 97 contains an overall list of all of the overlays 16 specified in the plurality of overlay I.D.'s 96 which are specified in all of the plurality of medium modification controls 92 within the plurality of form environment groups 93 within the plurality of medium maps 95. These overlays, when stored in local memory 41, may be in a raster form. Within overlay list 97 there is a raster indicator 120 for each overlay specifying whether that overlay is in raster form.

Likewise, each FORMDEF 36 contains a suppression name list 113. This suppression name list 113 contains the names of all the suppressions that are identified in all the suppression I.D.'s 112 of a given FORMDEF 36. Medium descriptor 116a indicates the pel density of the visual display. Page position 116 is a high level specification of locations on the printed physical page at which the various logical pages under control of a FORMDEF are positioned. It, therefore, acts as a default page position for all forms produced using a FORMDEF 36. However, for any given individual logical page to be later printed under the control of the FORMDEF 36, page positioner 116 may be overridden by that logical page's individual page position 107 within that page's individual form environment group 93. Overlay list 97, with its corresponding raster indicators 120, medium descriptor 116a, suppression name list 113, page position 116, and form group description table 700 constitute the document environment group 99.

Referring now to FIG. 6, the details of PAGEDEF 32 are shown. PAGEDEF 32 is a page definition file which controls PSF 28 in its processing of an input line mode data set 22 seen in FIG. 4. PAGEDEF 32 is also referred to as page map. PAGEDEF 32 is used to interpret systems printing data and convert it to the composed page format appropriate for visual display 42. PAGEDEF 32 contains a plurality of data maps 124, each having an I.D. 125, an active environment group 136, a map index 191, and a plurality of data map transmission subcases 140.

Selection of one of the plurality of data maps 124 for use within PAGEDEF 32 may occur by either of two different means. An invoke data map structured field may be embedded within input data set 22 to cause selection of one a plurality of data maps 124. Alternatively, the page group description index 710 may be employed. Index 710 is a table comprising a transmission number range list 712 and a data map I.D. list 714. Data map I.D. list 714 contains a data map I.D. 125 for each transmission number range in transmission number range list 712. For a given transmission number, a preselected I.D. 125 is thus derived from index 710. Such an I.D. then permits activation of its identified data map 124.

Selection of a particular data map transmission subcase 190 is effected by reference to map index 191. Map index 191 contains a transmission number range list 191a and a data map transmission subcase I.D. list 191b which function, in a manner analogous to index 710, to allow the selection of a subcase 140 on the basis of the active transmission number and subcase I.D. 141. Data map transmission subcases may also be selected by reference to a transmission range list 191c contained within map transmission subcase.

Data map transmission subcases 140 contain a plurality of line descriptors 150, a data map transmission subcase I.D. 141, a transmission number range 19c, and a fixed text data buffer 144. There is a line descriptor 150 for each record controlled by data map 124, each containing the information required to format a record of line mode data of input data set 22 into the proper spatial and informational relationships for visual display 42. Each line descriptor 150 contains a start field 142 which indicates the (X,Y) Cartesian coordinates on the logical page at which printing is to commence; a direction field 143 which specifies the direction in which printing is to proceed from the starting (X,Y) position (e.g., right, left, up or down) and thereby establishes the print base line; a font field 145 which specifies which font 34 is used for printing or displaying the record; a rotation field 146 which specifies the rotation of the individual characters with respect to the print base line; a suppression field 147 which specifies the parts of a particular record which are to be primed for suppression; and a constant data field 149 containing flag 149a for inserting known constant data or line mode record data from buffer 144 or record 68 into the output display.

Suppression field 147 merely primes data for later suppression. Data which are primed as candidates for suppression at this level may appear on some forms but be suppressed on others under the control of the same FORMDEF 36. However, FORMDEF 36 may never enable suppression of a data item by visual display 42 which is not primed. Note that the priming of data for suppression, which is controlled by suppression field 147, is only applicable to conventional line mode data. Suppression of data already in CPDS format, as well as all other operations performed on CPDS format such as placement on page, is not controlled by line descriptor 150.

Constant fixed data used in the visual presentation controlled by a data map 124 may be contained in fixed text data buffer 144. This constant fixed data may be used to replace text within the record corresponding to the line descriptor 150. Constant data field 149, therefore, contains a vector indicating the origin of data as an offset either into record 68 or into fixed text buffer 144 and a magnitude or length which indicates the amount of data to be used. Constant data field 149 also contains flag 149a to direct which source of data is used. If flag 149a is "ON," data are accessed from fixed text buffer 144. If flag 149a is "OFF," data are accessed from record 68. In either case, constant data field vector 149 determines the offset and length of the data used.

In addition, line descriptor 150 contains three pointers, each for linking its line descriptor 150 with other lien descriptors 150 to form three distinct chained lists. There is a line descriptor 150 corresponding to each record controlled by a data map 124. Depending on the CC 71 at the beginning of the record 68, the same line descriptor 150 may be used for several records 68 or several line descriptors may be skipped when processing successive records 68.

FIG. 1 will not be considered in conjunction with FIG. 6. An input data set 22, which is in line data format, has carriage controls that contain the instructions for placing data on the page in a line-by-line, sequential order. This order corresponds to the order of generation of these lines of data by application program 14. Such line mode format data are converted to composed page output data sets 30 by interactions of PSF 28 and PAGEDEF 32.

The three pointers in line descriptor 150 (each corresponding to one of the three chained lists) comprise list space pointer 151, list skip pointer 153, and list reuse pointer 155. Whether PSF 28 spaces, skips line descriptors, or reuses lines of text (whether the list corresponding to pointer 151 or 153 is used) depends upon the control character in line mode records in input data set 22. Whether PSF 28 reuses lines of text (whether the list corresponding to the pointer 155 is used) depends upon PAGEDEF 32. Additionally, reuse pointer 155 has associated with it a field indicating a starting position within a record 68 and a length which, together, indicate what portion of the record 68 is to be displayed when the record 68 is reused.

Figure 18A:
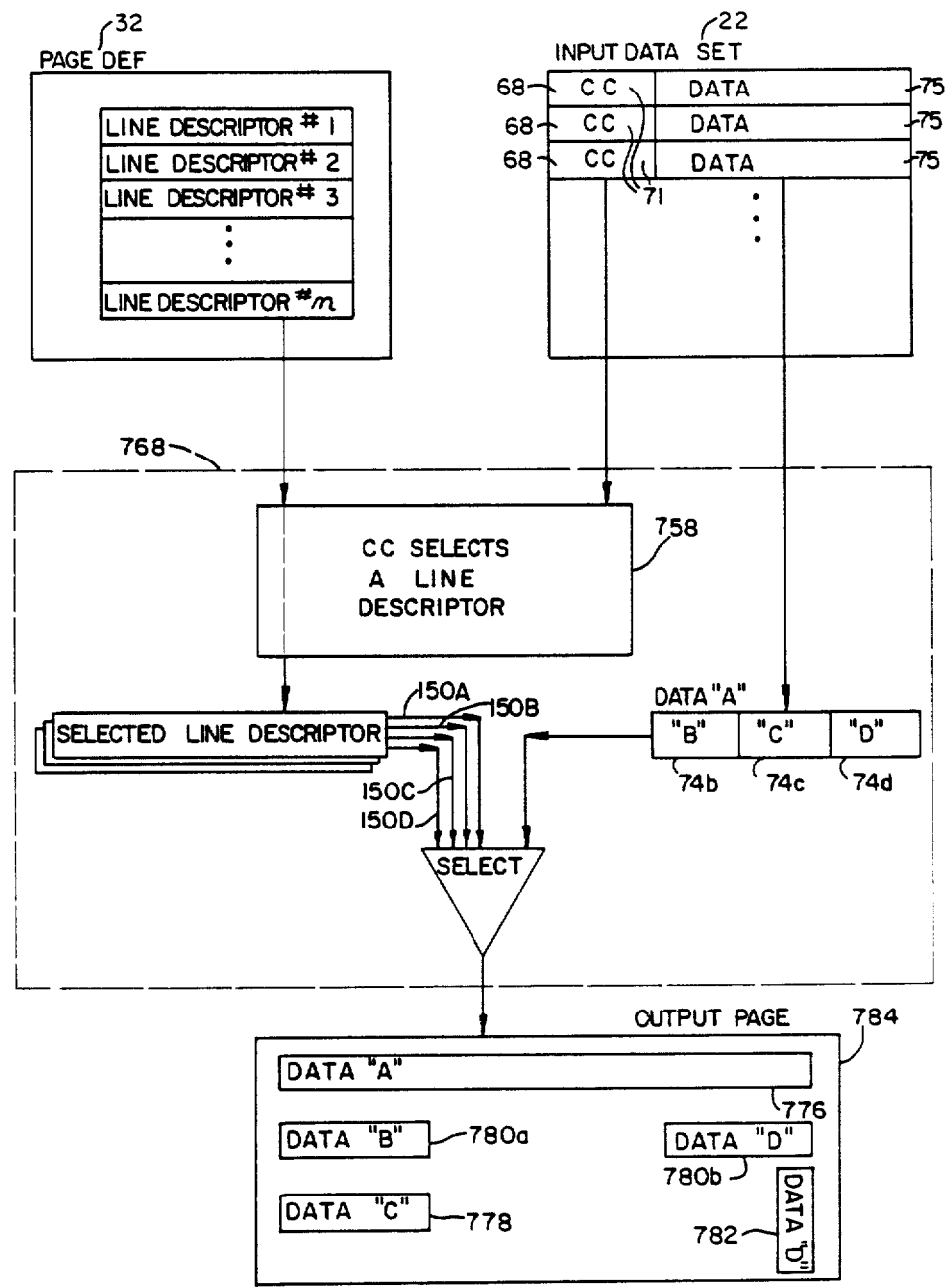
FIGS. 18a and 18b illustrate operation flow examples of the Systems Printing Manager.

Referring to FIG. 18A, an illustrative example of the use of line descriptor 150 within PAGEDEF 32 is shown. FIG. 18A shows a PAGEDEF 32 with n line descriptors and an input data set 22 containing records 68. Each record 68 contains a carriage control 71 (CC). Using the carriage control 71, the appropriate line descriptor 150 for each record 68 is chosen, as seen in block 758. Record 68 containing data 75 is shown containing three fields 74: field 74b containing data B, field 74c containing data C, and field 74d containing data D. A plurality of line descriptors 150a–d is also shown.

Line descriptor 150a contains the information necessary to specify the printing of record 68, as shown in output page 784. That is to say start field 142 specifies that record 68 is printed at location 776 starting at the upper left-hand corner of output page 784. This record is printed with the normal direction and rotation shown, with an appropriate font 34 specified in field 145, and with no suppressions specified in suppression field 147.

Line descriptor 150b contains the information necessary to specify the printing of fields 4b and 74d as shown at locations 780a, b within output page 784. Line descriptor 150b is linked to line descriptor 150a as the next location of the chained list linked by the pointer in the list reuse pointer field 155. This information directs SSPM 54 to use line descriptor 150b immediately after using line descriptor 150a and to reuse record 68 with line descriptor 150b. Within line descriptor 150b, start field 142 specifies the printing of field 74b at location 780 within output page 784. Again, direction field 143 and rotation field 146 specify the normal direction and rotation. However, suppression field 147 of line descriptor 150b contains the appropriate information to prime field 74c for suppression in order to display only fields 74b and 74d as shown.

In a preferred implementation of the invention, all data whether it is to be suppressed or visually presented is supplied to the presentation device as if it were to be printed; other variations may be used wherein the data can extend beyond the confines of a logical page.

Following the reuse-chained list specified in the list reuse field 155 of line descriptor 150b, visual display 42 is directed to reuse record 68 and to use the specification information contained within line descriptor 150c which is pointed to by list reuse field 155 of line descriptor 150b. The start field 142 of line descriptor 150c specifies that field 74c be displayed at location 778 of output page 784 as shown. List reuse field 155 directs that only the portion 74c of record 68 be reused and displayed. This is a reuse function.

Line descriptor 150d, linked with line descriptor 150c in the manner previously described, contains a start field 142 corresponding to location 782 and an appropriate font specification in font field 145. List reuse field 155 specifies that only 74d be reused and thus another reuse function is performed. However, in the case of field 74d, direction field 143 specifies the direction shown at 782 of output page 784.

This example thus shown how a record of data may be displayed at different start locations, with different suppressions, and with different directions. Furthermore, it shows how a record may be reused and how portions of it may be suppressed and portions selected for visual presentation using the reuse-chained list. After following the reuse-chained list from line descriptor 150a through to line descriptor 150d, the next line descriptor 150 is chosen using either the space-chained list or the skip-chained list according to the control indicated by the next CC 71.

Figure 18B:
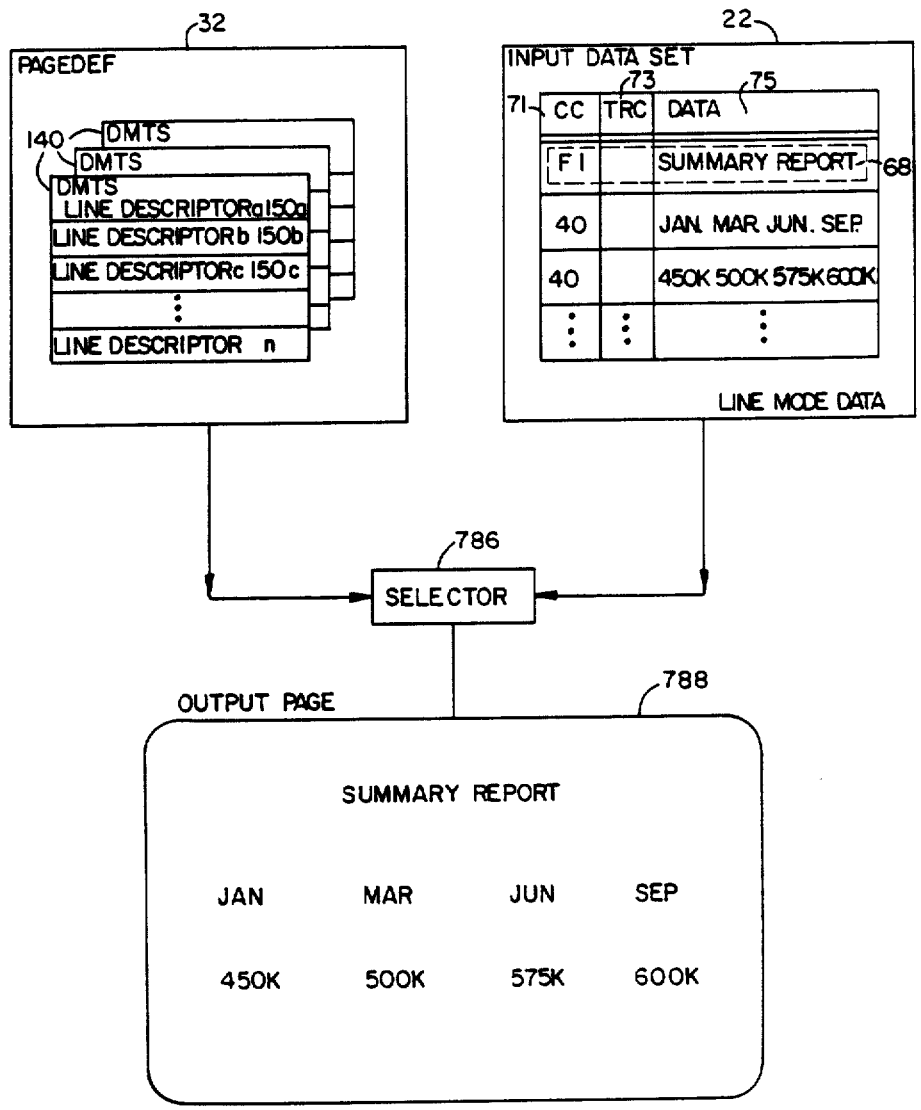

FIG. 18B shows a more specific example of the use of line descriptors 150. A portion of PAGEDEF 32 and an input data set 22 are shown. The portion of PAGEDEF 32 shown contains a plurality of data map transmission subcases 140 containing a plurality of line descriptors 150a–n. Input data set 22 contains conventional line mode data arranged in records 68, each record 68 containing a CC 71, TRC 73, and data 75. Within selector 786, the control character CC 71 within each record 68 selects the appropriate line descriptor 150 and the records of input data set 22 are displayed as shown in output page 788. Additional detail may be found in Appendix A.

Returning now to FIG. 6, PAGEDEF 32 also contains font list 132, segment list 128, and logical page size 137. Font list contains an overall list of all the fonts required by the font fields 145 of all of the line descriptors 150 for a given data map 124. Segment list 128 contains a list by name of all the segments identified in a data map 124. A segment 20 is a final image, text with graphics, or copy which is repeated so often as to become inefficient to retransmit each time it is required for visual display. It is, therefore, stored as a segment 20 with a segment name on DASD 50. When resource manager 58 of FIG. 3 processes an input data set 22 under the control of a PAGEDEF 32, segment list 128 is compared with a list, internal to resource manager 58, which contains the I.D. of all segments 20 currently resident in the local memory 41 of visual display 42. If a segment I.D. is found in segment list 128 and is not found in the list of resident segments, it is accessed from DASD 50 and transmitted to visual display 42 via logical resource channel 63.

Since the size of a logical page within the actual physical page may vary, logical page size 137 specifies the printable area which is under the control of the data map 124. Font list 132, segment list 128, and logical page size 137 together constitute the active environment group 136 for the logical page controlled by the data map. Input data sets 22 which are in CPDS format also contain a plurality of pages, each of which may also have an active environment group. Additionally, CPDS has a master environment group which contains default information for pages which do not contain a complete active environment group. If the active environment group 136 is only partially defined, the parts not defined default to the master environment group.

The various data maps 124 within a given PAGEDEF 32 may be called according to their I.D. 125 from the invoke data map in the input data stream. The plurality of data maps 124 within PAGEDEF 32 allows dynamic changing of the format of pages in much the same fashion that the plurality of medium maps 95 within FORMDEF 36 allows dynamic changing of the format of documents. Thus, the same logical page of output data may be printed in various formats using the same PAGEDEF 32 by keying successive transmissions of the output data with variations in output format to successive data map I.D.'s 125. Alternately, this may be accomplished by keying successive transmissions to various transmission subcases 140.

In order to assist in keying successive transmissions to the appropriate data map 124, PAGEDEF 32 contains page group description table 710. Page group description table 710 contains two lists: a transmission number list 712 and a data map I.D. list 714. The appropriate data map 124 is determined by locating the transmission number of the current transmission in transmission list 712 and choosing the corresponding entry in I.D. list 714. The corresponding entry in list 714 is the I.D. 125 of the appropriate data map 124. However, the selected data map may be overriden by an "invoke data map" command imbedded in IDS 22.

Figure 7:
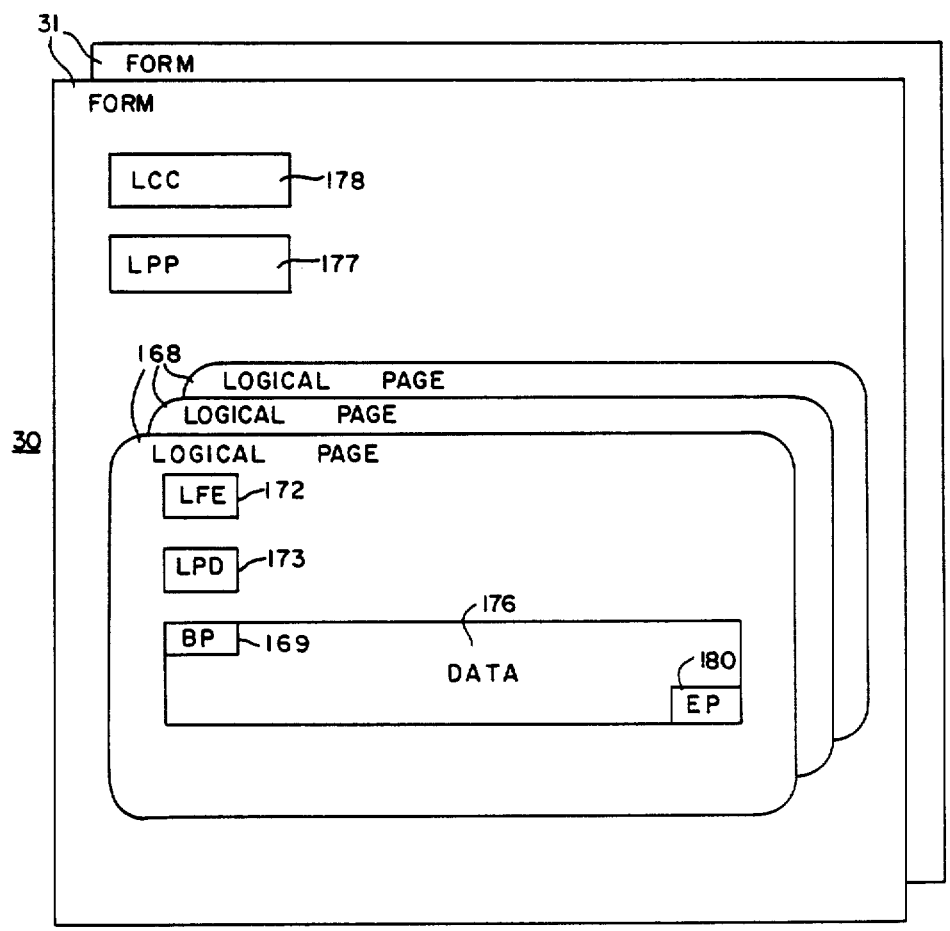
FIG. 7 illustrates the format of Output Data Sets.

Referring now to FIG. 7, there is shown an output data set 30 in the composed page format. It will be understood that this data set exists within the environment of an electronic data processing host computer. The data set comprises a plurality of electronic signals representative of text and control information. In FIG. 3, output data set 30 is transmitted through logical channel 61 from selection and combination means 56. Resources corresponding to those text controls embedded within the output data set 30 are managed and delivered to visual display 42 by transmission through logical resource channel 63. These resources are merged with output data set 30 within visual display 42 to produce the finished visual display document. When visual display 42 encounters a resource control within output data set 30 it accesses the corresponding resources which have been stored in its local subsystem memory 41 by transmission from resource manager 58.

An output data set 30 may contain a plurality of forms 31, as seen in FIG. 7. Each form 31 may contain a plurality of logical pages 168, reflecting that a plurality of logical pages 168 may appear on a single physical output page produced by visual display 42. These logical pages 168 are positioned on the physical output page according to channel control words embedded in output data set 30. If only one logical page is printed on the physical page, as is normally the case, then a single logical page 168 appears in a form generated under control of form descriptors which embody the controls of load copy control 178 and load page position 177.

Each form 31 contains two channel control words which have been embedded under the control of FORMDEF 36. They are the load copy control CCW 178 and the load page position CCW 177. The most recent CCW's sent to display 42 control the display of each of the logical pages 168 contained within a form 31. This form 31 is used on all sheets until a new form 31 is received. The load copy control CCW 178 instructs visual display 42 to use certain information from FORMDEF 36. This is necessary because certain functions are implemented inside visual display 42 during the process of merging the output data set 30 and the various system resources to produce a display. Examples of these functions include suppressions, overlays, forms flashes, and multiple copies of the same form. The load page position CCW 177 supplies information from FORMDEF 36 to visual display 42 on the location within the physical output page of the logical page 31.

Each logical page 168 additionally has two channel control words: load font equivalents CCW 172 and load page descriptor CCW 173. These two control words in logical page 168 are provided by PAGEDEF 32 if input data set 22 is conventional line mode data, or by a CPDS active environment group/master environment group if input data set 22 is in composed page format.

Load font equivalent 172 is a pointer which refers to the mapping of fonts in local memory 41 of visual display 42. The actual font digital data used by visual display 42 to produce logical page 168 are transmitted to local memory 41 through logical resource channel 63 separately from output data set 30, which is transmitted to visual display 42 over logical channel 61. Output data set 30, therefore, must have a load font equivalent 172 in order to point to the location in local memory 41 of the font 34 which is used for the logical page 168. The page descriptor indicated by load page descriptor 173 describes the layout for logical page 168. It defines the layout of the page including such characteristics as the width and length of the page.

The channel command words are created from structured fields. Thus, output data set 30 may be conceptualized as a sequence of channel command words, each containing an identification of the type and length of data and a pointer to the start of the data.

The data 176 of logical page 168 is bracketed by a begin page 164 and an end page 180. Also, between begin page CCW 164 and end page 180 there may be a write text CCW to further position the data relative to the page origin determined by load page position 177. Thus, this write text CCW is an offset. Included within data 176, in any order, there may be image, text, page segments, and text controls.

Figure 8A:
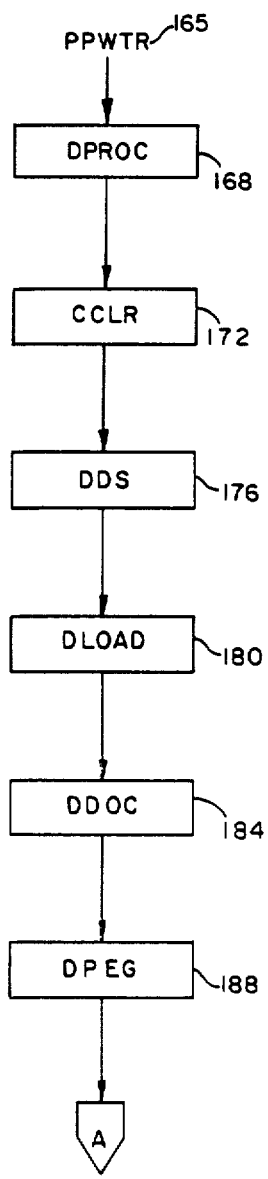
FIGS. 8A and 8B depict a time sequence of operations of the Print Services Facility Program.
Figure 8B:
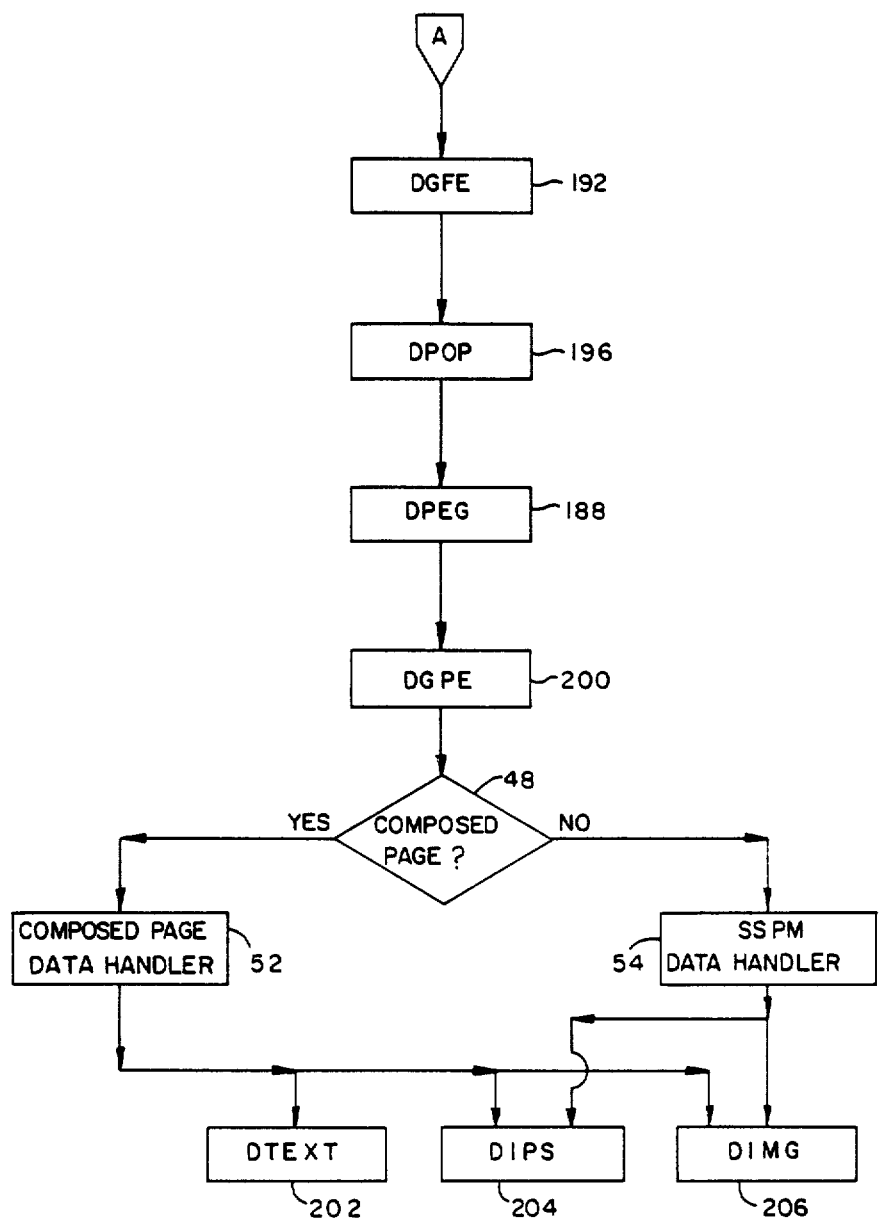

FIGS. 8A and 8B describe, in somewhat more detail, this sequence of operations performed in the creation of an output data set 30 from an input data set 22. The sequences shown in FIGS. 8A and 8B are not a logical flow but rather a series of recursive procedure calls. Sniderman diagrams describing the modules shown in FIGS. 8A and 8B appear at the end of the specification as Appendix B and are shown in a structured form understandable by those of ordinary skill in the art. An individual Sniderman diagram setting forth details of the operation of each major module of PSF 28 is provided in Appendix B. The sequence starts when the pending page writer 165 receives a spooled data set from application program 14 and sends it to a device one record at a time. The device may be either hardware, such as a display unit, or it may be another piece of software. In the present instance, pending page write 165 receives an input data set 22 and transmits it to PSF 28 for processing. PSF 28 consists of a main module DPROC 168 and its called procedures.

DPROC 168 first makes an optional call to CCLR 172 whose function is to clear subsystem memory 41 as previously described for block 43 of FIG. 2. Recall that local memory 41 is only cleared if it is desired that a previous job be removed.

Regardless of whether local memory 41 is cleared, DDS 176 is called. DDS 176 is called by DPROC 168 when DPROC 168 recognizes the beginning of an input data set 22 as seen in FIG. 4.

When control is passed to DDS 176 by DPROC 168, DDS 176 executes DLOAD 180. DLOAD 180 is a resource control program which now loads the default resources into the subsystem and returns control to DDS 176. When DDS 176 detects the beginning of a document, it transfers control to DDOC 184. DDOC 184 determines which resources are required to process the document and compares this requirements list to a list of resources already available within the memory of visual display 42, which is maintained within resource manager 58, shown in FIG. 3.

DDOC 184 then calls DPEG 188. Both DPEG 188 (page environment group) and the next module called, DGFE (generate form environment) access FORMDEF 36. DPEG 188 sets up internal control structures which comprise a master environment group. DGFE 192 references a form environment group. As determined by the contents of FORMDEF 36, resources such as overlays 16, which DDOC 184 has determined are required but are not currently resident in visual display 42 are retrieved from DASD. DGFE 192 also generates appropriate CCW's for controlling the use of resources by visual display 42.

If the beginning of a page is then detected by DDOC 184, it transfers control to DPOP 196. DPOP 196 uses DGPE 200 to determine whether any resources are required for the page being processed but not called globally for the document; for example, a font which is unique to the current page. DGPE 200 calls resource manager 58 which uses DLOAD 180 to access these resources. DGPE 200 handles segments 20 and fonts 34 including generating the appropriate CCW's for identified resources. Whenever any resources are so accessed, the resources list maintained within resource manager 58 is updated.

As previously described, input data set 22 may have a conventional line data format or a composed page format or a mixture of line data and composed page data. Systems printing data include both pure line data and the mixture. In decision diamond 48 of FIG. 8B, a determination is made as to which format of input data set 22 is being presented for processing, and execution is passed to the appropriate data handler.

The two available data handlers are the SSPM (System Print Manager) data handler 54, set forth in appendix A, which processes conventional line data and the mixture of line data and composed page data, that is, systems printing data, and the composed page data handler 52 which processes the input data sets containing only composed page data. Each of these in turn calls appropriate modules to transmit information to the output data set 30. These modules include DIPS 204 and DIMG 206 which are called by SSPM data handler 54. DIPS 204 causes include page segments to be embedded and corresponding segments 20 have been transmitted to visual display 42 by DGPE. DIMG 206 causes images to be embedded in output data set 30. In addition to calling DIPS 204 and DIMG 206 for the same purposes that SSPM data handler 54 called them, composed page data handler 52 calls DTEXT 202. DTEXT causes textual information to be transmitted to output data set 30.

Referring again to FIG. 1, data to be printed by application program 14 in the form of input data set 22 are processed by PSF 28 into an output data set 30 and transmitted to output writer 38 for display on visual display 42. The input data set 22, as seen in FIG. 4, may consist of line data organized in the form of a plurality of records 68 or may already be in composed page form. The default processing shown in block 44 of FIG. 2 determines all resources which are used if no specific resources are specified. In resource processing block 46 under control of PAGEDEF 42 and FORMDEF 36, resources which are required for the processing are compared with lists retrieved as necessary, as shown in the sequence of operations diagram FIGS. 8A and 8B. At this point a determination is made in decision diamond 48 as to whether input data set 22 is in composed page format or in line data format, and the appropriate data handler is called in order to create a composed page form of the page for output data set 30.

Having described the sequence of operations in FIGS. 8A and 8B, the description will now turn to FIGS. 9–17 which detail the logical flow of control which produces the time sequence detailed here and above.

Figure 9:
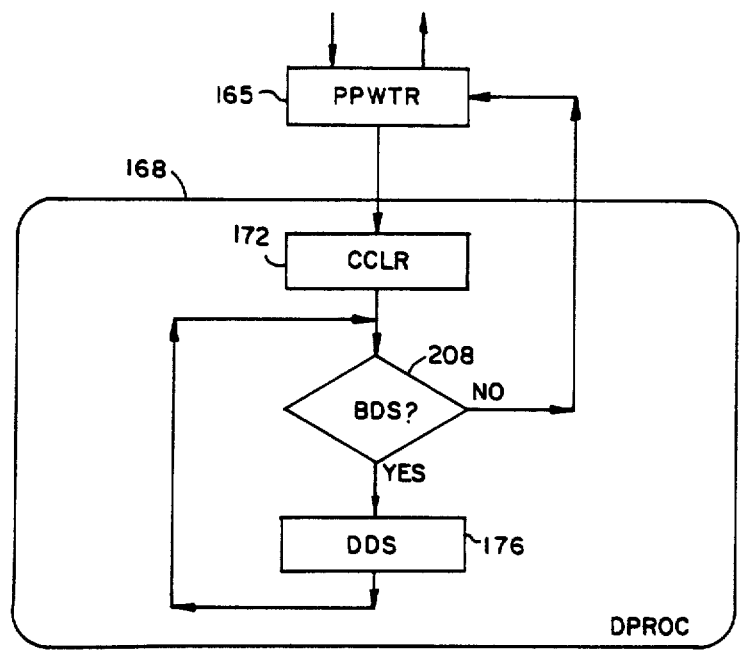
FIG. 9 illustrates the flow of control for the DPROC procedure.

Turning now to FIG. 9, pending page writer 165 is a software and spooling device of a known type which spools its output record by record to routine DPROC 168. DPROC 168 may begin by a call to routine CCLR 172. CCLR 172 is optionally called to clear the printer subsystem memory 41. In addition to simply clearing and resetting, CCLR 172 may invoke the resource manager 58 to transfer known required resources to visual display 42. DPROC 168 next examines in decision 208 the input data set 22 to determine whether a new data set is beginning. In the absence of a beginning, DPROC 168 returns to PPWTR 165 for another record. Upon detection of the beginning by decision 208, DPROC 168 calls routine DDS 176. Upon normal termination DDS 176 returns control to DPROC 168 for further examination of data sets according to decision 208.

Figure 10:
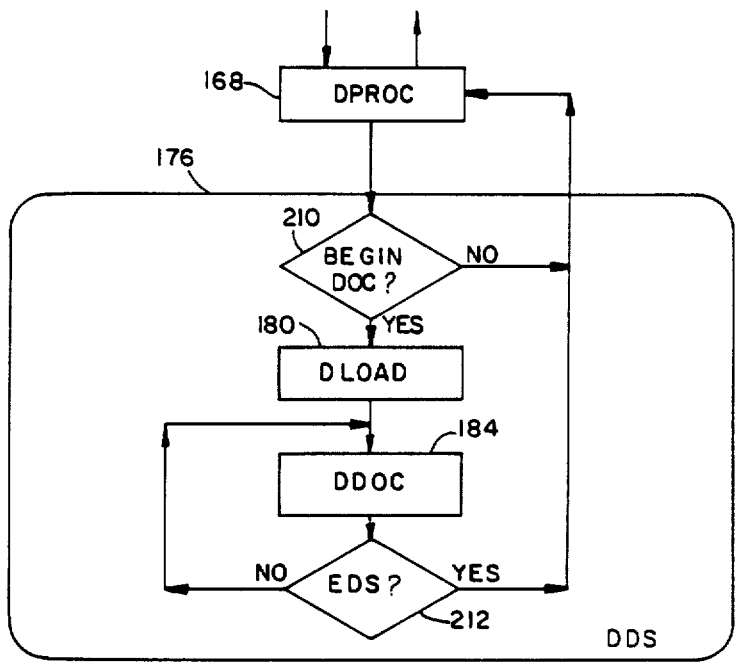
FIG. 10 illustrates the flow of control for the DDS procedure.

Referring now to FIG. 10, DDS 176 begins by detecting the start of a record which signifies the beginning of a new document. Upon failure to detect the beginning of a new document, DDS 176 returns control to DPROC 168. This corresponds to a return to decision diamond 208 of FIG. 9. If a start of a record 68 is detected in decision diamond 210, DDS 176 may execute a call to DLOAD 180 if any system resources are required. DLOAD 180 transfers default resources to the device controller 60. After the return from DLOAD 180, DDS 176 executes a call to DDOC 184. DDOC processes documents by processing in a cyclic manner a plurality of pages with the associated forms and copy modifications and returns control to DDS 176 after it has finished processing the last page. DDS 176 then executes decision 212 and determines whether the end of the data set has been reached. If DDS 176 determines that the end of the data set has not been reached, DDS 176 again calls DDOC 184 for continued processing. However, if the end of the data set has been reached, DDS 176 returns to its calling module DPROC 168.

Figure 11A:
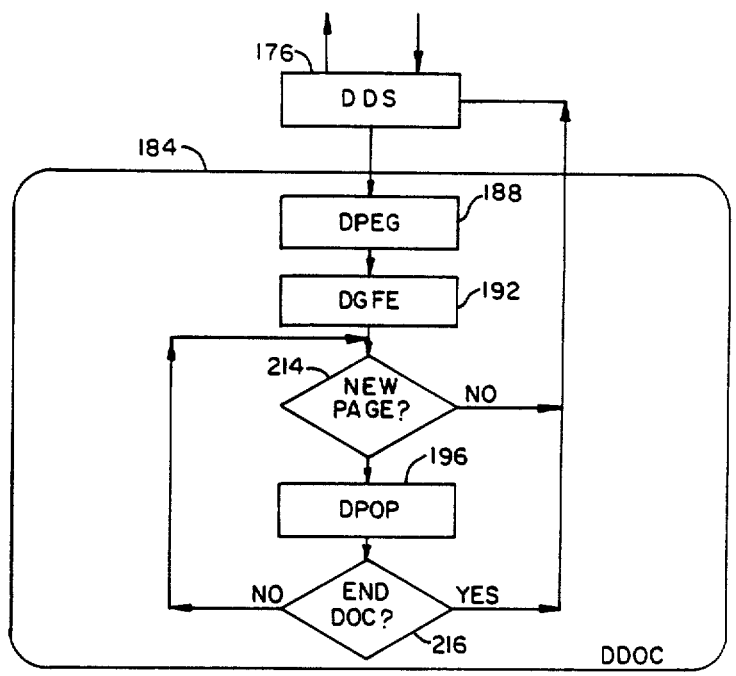
FIG. 11a illustrates the flow of control for the DDOC procedure.

Referring now to FIG. 11a, a more detailed representation of DDOC 184 is shown. In DDOC 184, control is passed to routine DPEG 188 and then to DFPE 192, which functions to recognize and transmit presently unavailable form-related resources to visual display 42. DDOC 184 then executes decision 214 to determine whether a new page is beginning. If a new page is initiated, control transfers to routine DPOP 196 which processes one page and returns control to decision 216 which determines whether the end of document has been reached. If the end of document has not been reached, control returns to decision 214 for a new page examination. However, if the end of document is detected, control is returned by DDOC 184 to its calling routine DDS 176.

Figure 11B:
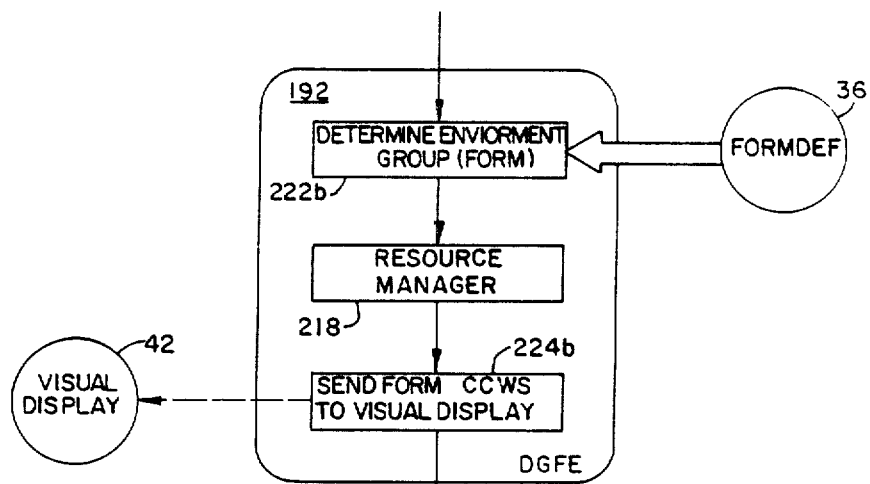
FIG. 11b illustrates the flow of control for the DGFE procedure.

Referring now to FIG. 11b, there is shown a more detailed representation of routine DGPE 192. When called, routine DGPE first determines the environment group parameters relating to the form environment by referencing the FORMDEF 36 at structure 222b. Routine DGFE 192 then calls resource manager 218 to deliver needed resources to the visual display 42. Finally, DGFE sends channel control words representative of that determined form environment to visual display 42 via procedure 224b.

Figure 12A:
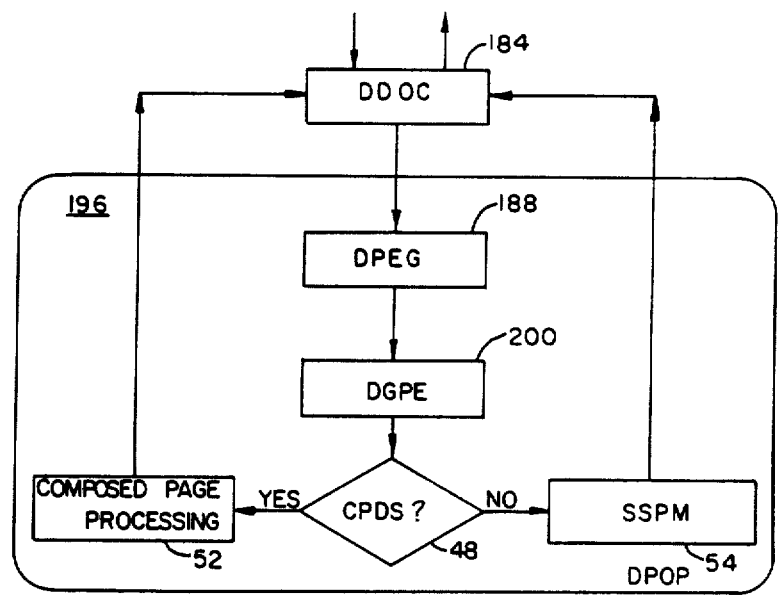
FIG. 12a depicts the flow of control for the DPOP procedure.

Referring now to FIG. 12a, which is a more detailed view of routine DPOP 196, DPOP 196 begins by transferring control to routine DPEG 188 which acts to transfer currently unavailable page related resources to visual display 42 via logical resource channel 63 and device controller 60. The call of DPEG 188 occurs only when there is an active environment group for a CPDS formatted page. If there is no active environment group for a CPDS formatted page, then the call to DPEG 188 is dispensed with. Following the conclusion of DPEG's activities, routine DGPE 200 is called to establish the page environment. The details relating to routine DGPE will be discussed more fully hereinafter.

Figure 14:
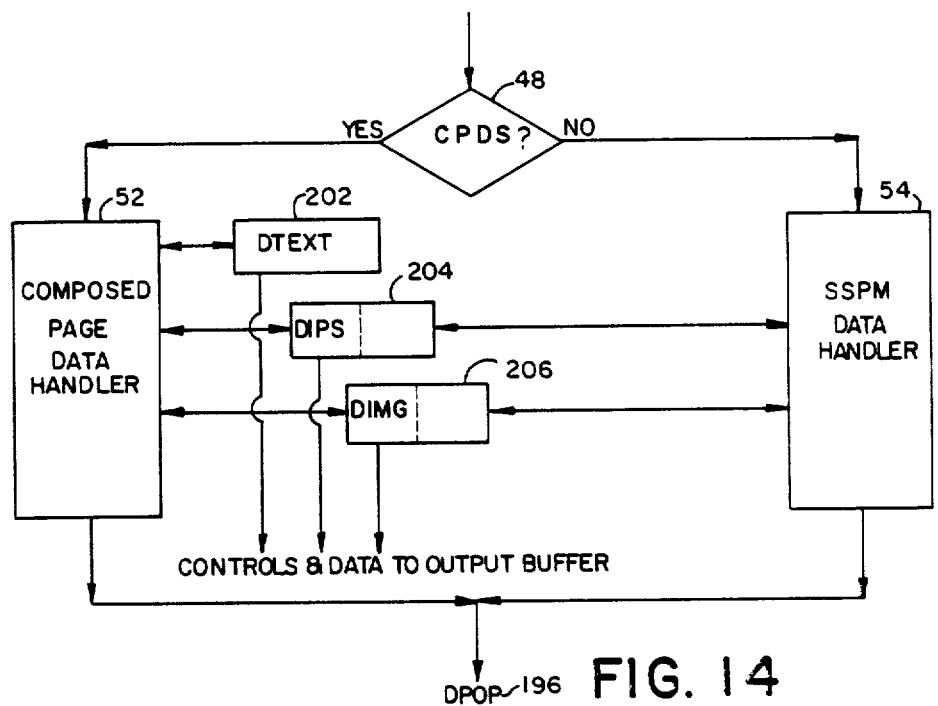
FIG. 14 shows elements 48, 52 and 54 of FIG. 12 in more detail.
Figure 16:
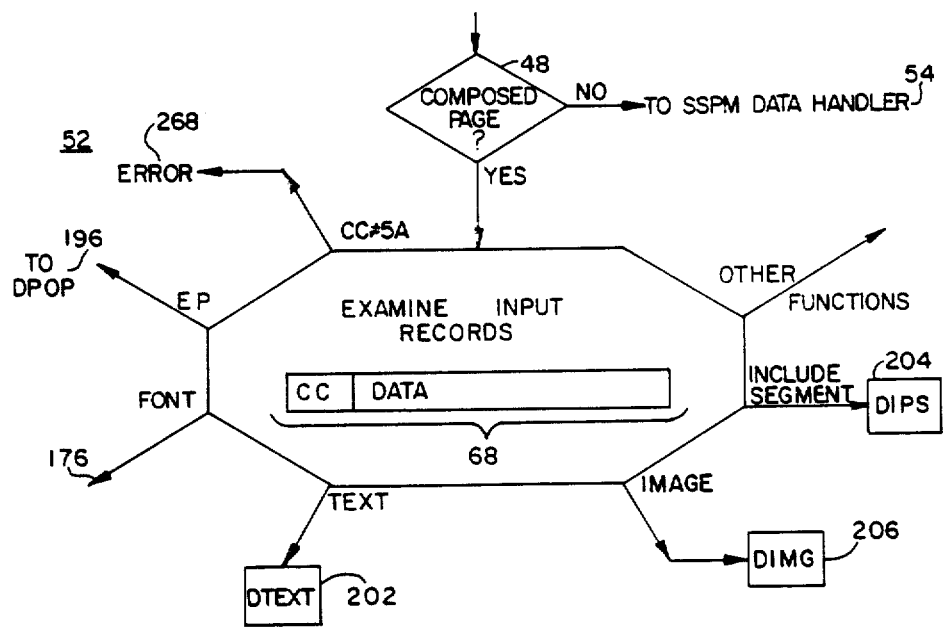
FIG. 16 illustrates the logical flow of the Composed Page Data Handler.

If decision 48 detects composed page format, control is transferred to composed page processing 52, as described with respect to FIGS. 14 and 16. If decision 48 detects conventional line data format, control is transferred to SSPM data handler 54, described with respect to FIGS. 14 and 15. Both composed page data handler 52 and SSPM data handler 54 return control upon completion of operations to DPOP and then to DPOP's calling module, DDOC 196.

Figure 12B:
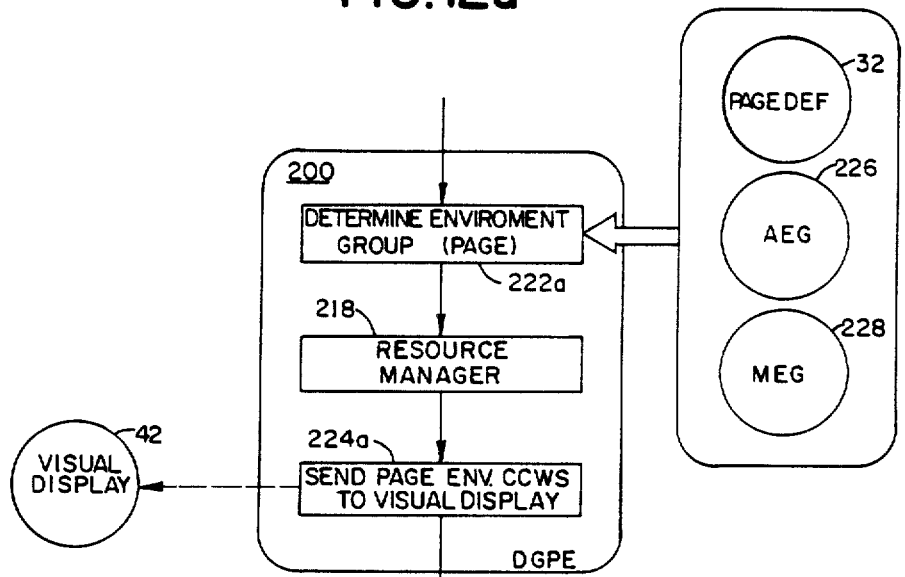
FIG. 12b illustrates the flow of control for the DGPE procedure.

Referring now to FIG. 12b, there is shown a detailed structure of routine DGPE 200. The purpose of routine DGPE 200 is to generate the necessary page environment for document processing. Upon being called, DGPE determines the parameters relating to the page environment by reference to PAGEDEF 32, and active environment group 226, or master group environment 228 at structure 222a. DGPE then calls resource manager 218 to deliver required resources to visual display 42 and then sends the channel command words representative of the determined page environment to visual display 42 via procedure 224a.

Figure 13:
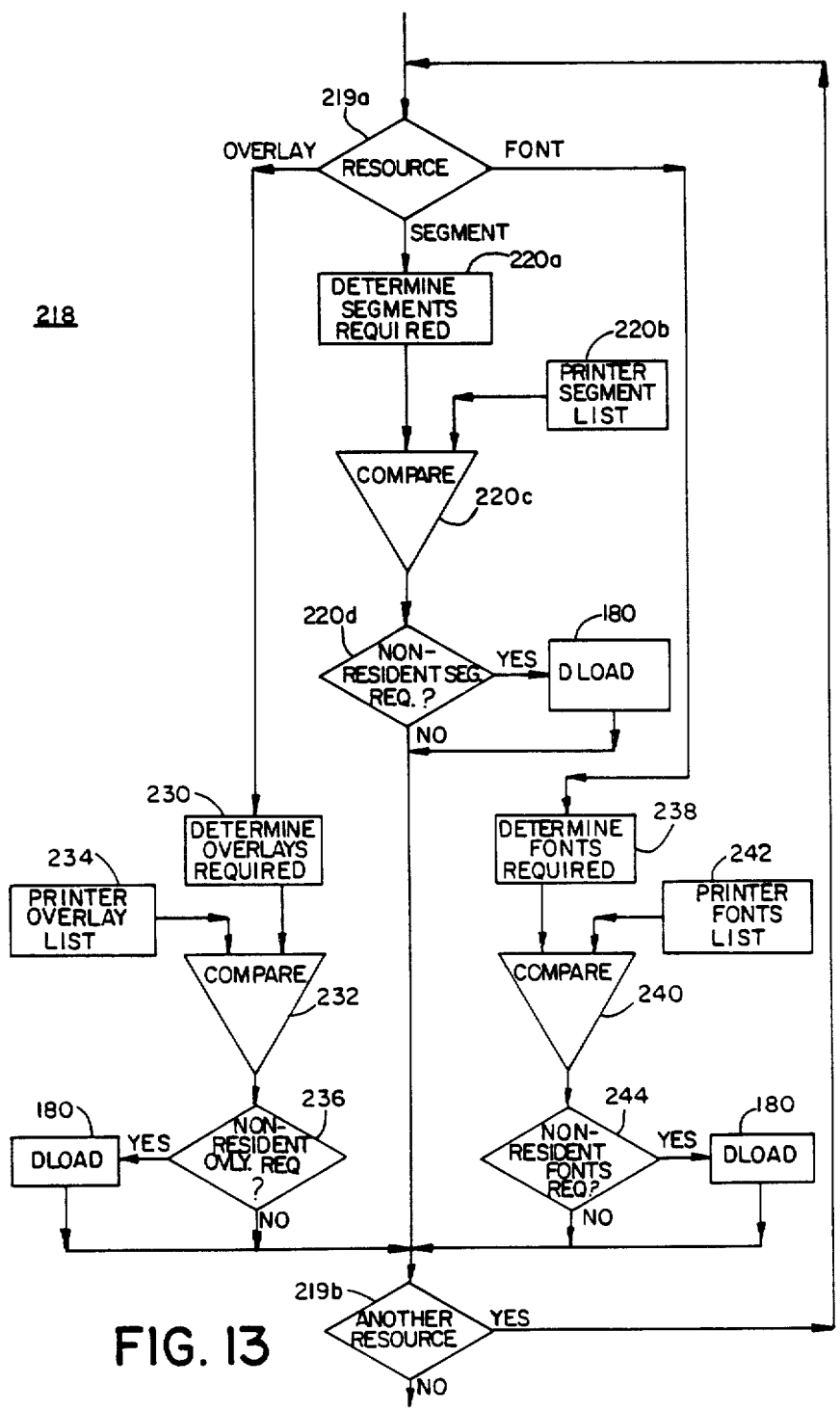
FIG. 13 shows the flow of operations for the Resource Management Procedure.

Referring now to FIG. 13, there is shown resource management procedure 218 which determines resource requirements and transmits resources to visual display 42 via logical resource channel 63 and device controller 60.

It will be understood by one skilled in the art that the three alternative paths which exist within resource manager 218 differ only as to the type of resource being processed (i.e. overlays, segments, or fonts) and that no logical or operational differences exist among these three paths.

Resource manager 218 is capable of processing three types of resources as set forth above. In order to determine the type of resource to be processed, resource manager 218 examines the type of resource being requested at decision 219a and branches accordingly. For the purposes of the present discussion, the three types of resources (overlays, segments, and fonts) will be termed "resources" and will not be differentiated. The first operation which occurs after decision 219a is a determination of the resources required through examinations of the environments and definition files used by PSF 28. These resource requirements are then compared to a list of printer-resident resources to arrive at a comprehensive list of those resources which are required. After such a comparison, a call to module DLOAD 180 is executed if resources which are not printer-resident are required. This call to module DLOAD 180 causes the transfer of required resources to visual display 42 via logical resource channel and device controller 60.

More specifically, if the resource to be processed is an overlay 16, decision 219a results in a call to determination 230 which determines which overlays are required. This is followed by a comparison of procedure 230's results with the printer overlay list 234 at comparison mode 232. Decision 236 is a determination of whether overlays which are not currently resident within the printer are required. If such nonresident overlays are required, module DLOAD 180 is called to transmit the appropriate overlays to the printer.

In a similar manner, processing of segments 20 follows a path through determination 220a, comparison 220c of the results of that determination with printer segment list 220b, decision 220d, and a possible call to DLOAD 180 for transmission of segments required.

Finally, if decision 219a determines that fonts 34 are to be processed, determination 238 is executed and its results compared with printer font list 242 at comparison 240. Resident status of the fonts required is determined at decision 244 which is capable of resulting in a call to DLOAD 180 for transmission of required fonts.

Each of the above control flows terminates in decision 219b which ascertains whether another resource remains to be processed during this activation of resource manager 218. If other resources remain to be processed, decision 219b results in a further execution of decision 219a to determine the type of resource required. In the event that no further resources are required, decision 219b terminates the operation of resource manager 218 and returns control to a calling module.

Referring now to FIG. 14 which is a general overview of the logical flow relationships between the composed page data handler 52 and SSPM data handler 54, input data set 22 is processed in accordance with decision 48 and routed to either composed page data handler 52 or SSPM data handler 54 on the basis of said decision 48. If the first character in an input record is "5A", that record is in CPDS format. Composed page data handler 52, in turn, calls DTEXT 202 in order to transmit textual information for output data set 30, DIPS 204 to embed include page segment commands or DIMG 206 to transmit images for output data set 30. Upon completion, composed page data handler 52 returns control to its calling routine DPOP 196.

SSPM data handler 54 calls DIPS 204 to include page segment commands in output data set 30 for activating visual display 42 to include a segment in the page. SSPM 54 also calls DIMG 206 to transmit an image for output data set 30. SSPM data handler 4 returns control upon completion to its calling routine DPOP 196.

Figure 15:
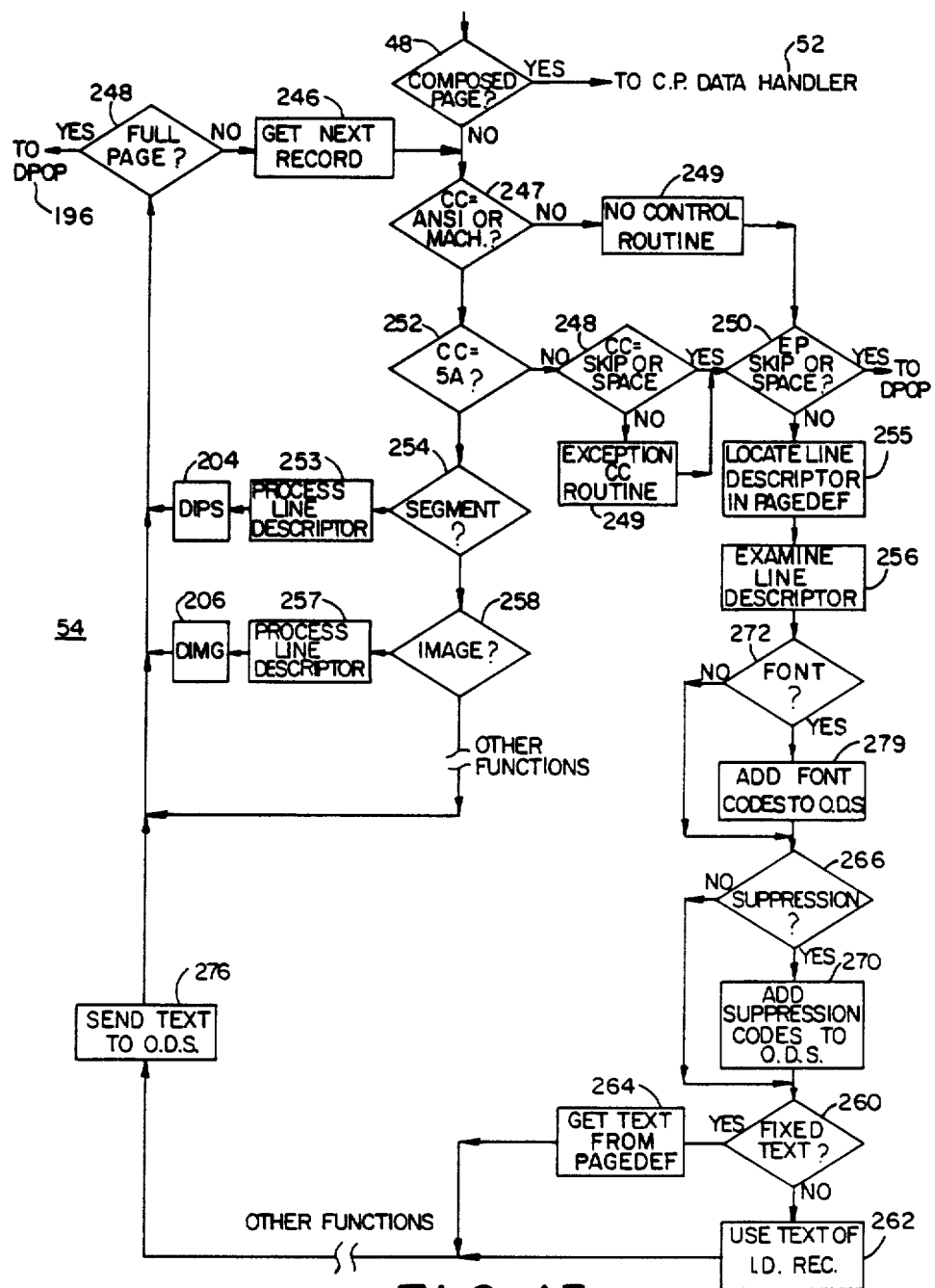
FIG. 15 details the flow of operations with the SSPM Data Handler.

Referring now to FIG. 15 which is a more detailed description of the SSPM data handler 54, input data sets 22, which are in the system printing mode line formatted data format, are transferred by virtue of decision 48 to decision 247 for examination of the first carriage control (CC) present. Decision 247 determines whether this first CC is an American National Standards Institute (ANSI) character or a machine character. If the first CC is neither of these, no control routine is being executed as seen in block 249 and execution proceeds to decision 250. If decision 247 determines that the first CC is either an ANSI-defined character or a machine character, decision 252 then determines whether it is a "5A". "5A" indicates that the record being processed is in composed page format (i.e., the input data set 22 being processed is an example of a record mixture, containing both conventional line mode data and composed page data). If decision 252 determines that the CC is not "5A" execution proceeds to decision 248.

Decision 248 determines whether this CC of line mode input data set 22 is either a skip or a space. If the CC is not a skip or space, an exception control character routine is executed in block 249. In this routine the unknown control character is tested to determine whether the data set should be treated as ANSI or machine control code, and execution proceeds to decision 250. When control is passed to decision 250 by any one of the above paths, decision 250 determines whether an end of page is appropriate. If decision 250 determines that end of page is required, control is returned to calling routine DPOP 196. If, however, end of page is not required, the line descriptor 150 of the record being processed is located in the controlling PAGEDEF 32 at block 255 and control is transferred to examination 256.

Examination 256 analyzes the line descriptor 150 within currently active PAGEDEF 32 and maintains the results of the analysis in memory. Control is subsequently passed to decision 272 which examines the results of the analysis of examination 256 in memory to determine whether fonts 34 are required, as indicated by fonts field 145 of line descriptor 150 seen in FIG. 6. If such fonts 34 are required, procedure 279 embeds codes representative of said fonts in output data set 30.

Decision 266 examines the results of examination 256 to determine whether a suppression is indicated by suppression field 147 of line descriptor 150 within data map transmission subcase 140 within data map 124 within active PAGEDEF 32. If such a suppression is indicated, procedure 270 brackets the data to be suppressed with codes representative of said suppression. Decision 260 again interrogates the results of examination 256 to determine whether constant data representative of fixed text is to be accessed from fixed text buffer 144 as indicated by flag 149a in line descriptor 150. If such fixed text is to be accessed, procedure 264 retrieves said fixed text from fixed text buffer 144 within active PAGEDEF 32. If no such fixed text is required, procedure 262 retrieves the text contained within input data set 22.

Similar procedures to those already detailed are undertaken to determine such other parameters as are described in line descriptor 150 of data map transmission subcase 140 of data map 124 of current PAGEDEF 32. Subsequently, all text with embedded codes representative of resources required is transmitted by procedure 276 to output data set 30 via logical channel 61. Control is then transferred to decision 248 for determination of whether the current logical page 168 is filled with data. If logical page 168 is full, control is returned to calling routine DPOP 196. If, however, logical page 168 is not full, routine 246 obtains the next record of input data set 22 and returns control to decision 247.

If decision 247 determines the CC is either ANSI or a machine control character, control is transferred to decision 252 to determine its values. If the CC examined in decision 252 does not indicate that the data is in composed page form, control is transferred to decision 248 as previously described. However, if the CC value for a composed page record is found, the input data set 22 being processed is a combination of conventional line mode data and composed page format, and control is transferred to decision 254 to determine whether a segment 20 is being requested. If such a segment 20 is requested, line descriptor 150 is processed as seen in block 253 and DIPS 204 is called to embed an include page segment control into output data set 30. Control then passes to decision 248 for determination of the completion of logical page 168.

If no segment is required, as determined by decision 254, control passes to decision 258 which determines whether an image is required. An image is a raster data representation of a graphic 18 or complex visual representation which cannot be displayed using standard character fonts 34. If an image is required, line descriptor 150 is processed as seen in block 257, and DIMG 206 is called to transfer that image to visual display 42 via logical channel 61 by including it in output data set 30 and device controller 60.

It should be noted that the flow of control beyond decision 252, encompassing decisions 254 and 258 and their calls to DIPS 204 and DIMG 206, constitutes a treatment of composed page format data within an overall data set conforming to the conventional line mode data format.

Referring now to FIG. 16, which is a detailed illustration of the composed page data handler 52, the flow of control of composed page data handler 52 is analogous to a case statement as is well-known in the data processing art. The case statement corresponds to a case of: resource (r) for which there are several alternatives, r includes the include page segment command which invokes routine DIPS 204; images 18 which invoke routine DIMG 206; text-type resources which invoke routine DTEXT 202; alternative 176 which sends fonts 34 to visual display 42; and indications of end of page conditions which case a return to calling routine DPOP 196. In the event that the CC of the input data record is not a 5A, error routine 268 is called to inform all calling routines and, in turn, the person who submitted application program 14 of the error condition.

Figure 17:
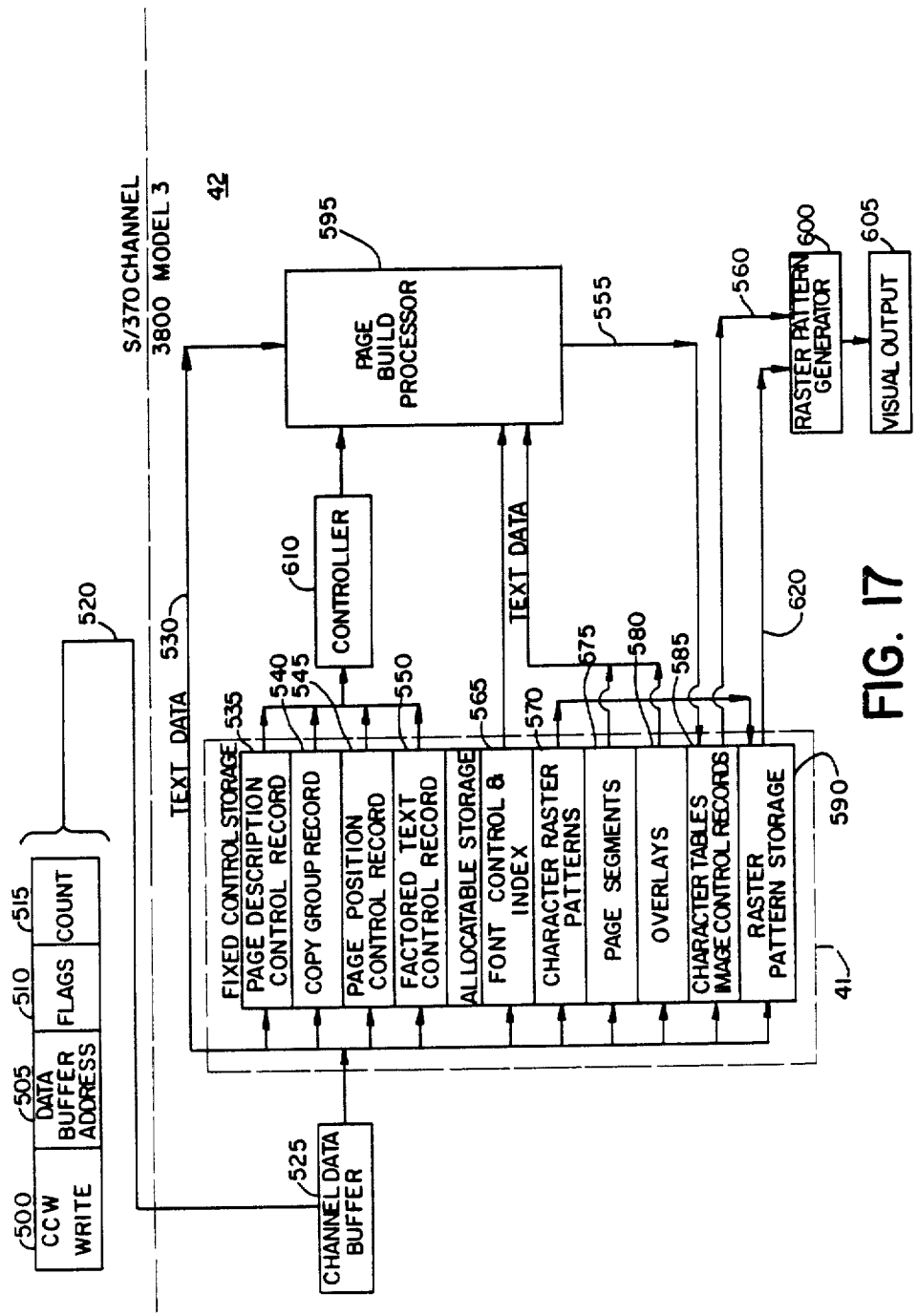
FIG. 17 depicts the internal memory and control architecture of the IBM 3800 Model 3 Printing Subsystem.

Referring now to FIG. 17, there is shown a detailed description of the internal configuration of the IBM 3800 Model 3 Subsystem.

A short description of this system is deemed helpful to a more complete explanation of the present invention. Channel data buffer 525 is connected to a communications channel from a host CPU via line 520. Communicated across channel 520 are channel command words containing channel command word 500, data buffer addresses 505, status flags 510, and data counts 515. Channel data buffer 525, in turn, communicates data to both fixed control storage and allocatable control storage within subsystem 42. Text data is communicated from channel data buffer to page build processor 595 over line 530.

Form description control records containing information descriptive of forms derived from FORMDEF 32 are transmitted to fixed control storage 535. Form environment group records, containing information descriptive of form environment groups 93 derived from FORMDEF 36, are transmitted via load copy control 178 and load page position 177 to fixed control storage 540. Form environment information derived from FORMDEF 36 at its page position records 107 or, in default situations, its page position 116 is transmitted via load page position CCW 177 to fixed control storage 545. All control signals maintained in fixed control storage 535, 540, 545, and 550 are transmitted via controller 610 to page build processor 595.

Font control and index information associated with raster patterns representative of characters within said fonts are transmitted from channel data buffer 525 to allocatable stores 565 and 570. Said character raster patterns stored at allocatable storage 570 are subsequently transmitted to raster pattern storage 590 for later inclusion by raster pattern generators 600. Other resources, including page segments 20, overlays 16 and images, are transmitted from channel data buffer 525 to allocatable storage and held respectively at allocatable storage 575, 580 and 585. Font control and index information are transmitted from allocatable storage 565 to page build processor 595 for control and selection of display fonts within the currently processed page.

Page segments held at allocatable storage 575 and overlays held at allocatable storage 580 are similarly transmitted to page build processor 595 for inclusion in the currently processed page. The output of page build processor 595, representative of a completed page of display information, is transmitted to allocatable storage 585 via transmission line 555. Such information is subsequently transmitted to raster pattern generator 600 via line 560. Raster pattern generator 600 includes a buffer for raster pattern data, a serializer for extraction of data from said buffer, and a modulator for a laser. Said laser imparts the raster pattern stored within the raster pattern buffer to visual output 605.

While the invention has been particularly shown and described with reference to a preferred embodiment thereof, it will be understood by those skilled in the art that various changes in form and details may be made therein without departing from the spirit and scope of the invention.

GLOSSARY addressable point. A point that can be identified by coordinates.

all-point addressability. The capability to address, reference and position text, overlays and images at any defined point on the printable area of a form, either on a sheet or other image presentation medium.

channel command. A computer peripheral instruction that directs a data channel, control unit, or device to perform an operation or set of operations.

character. An element of a character set that is used as part of the organization, control, or representation of data.

character arrangement. An arrangement composed of graphic characters from one or more modified or unmodified character sets.

character raster pattern. The scan patterns for a graphic character of a particular size, weight, and style.

character set. A finite set of different characters that is considered complete for some purpose. It may include graphic and control characters.

compatibility mode. A mode of operation that provides the capability to run application programs written for the 3800 Model 1 on the Model 3 with little or no change to the application or the job control language.

control assembly. The unit that contains the diskette file, power supplies and controls, and the control electronics.

control electronics. The group of electronic circuits, storages, and microcode that control printing operations and communications with the host processor through a channel.

control storage. See local storage.

copy modification. The process of adding, deleting, or replacing data on selected copies of certain pages of a data set.

electronic overlay. A collection of constant data that is electronically composed in the host processor and may be merged with variable data on a sheet during printing. An electronic overlay defines its own environment. It can be in coded form or raster pattern form.

font. A collection of graphic characters of one size, weight, and style, independent of code points; for example, 9 point Bodoni. A font has a unique name and may have a registry number. A font is data used to create an image of each graphic character; for example, a raster pattern.

form. A set of control data that defines informational content and its structure by specifying logical page, one or more physical sheets, lines in pages, fields within lines, items within fields, and other elements for one or many presentations of a data set.

forms control buffer (FCB). A data buffer for controlling the vertical format of printed output. The forms control buffer is analogous to the punched-paper, carriage-control tape used on IBM 1403 printers, for example.

forms design. The process of creating a constant-data design that can be used for preprinted forms, forms overlays, or electronic overlays.

forms flash unit. The unit that contains a xenon flash lamp, power supply, and optical path. It sends a flash of light through the forms overlay to the photoconductor.

forms overlay. The photographic negative of a predefined design to be exposed to the photoconductor by a flash of light. The forms overlay can be merged with variable data during printing.

graphic character. A character that is normally represented by a graphic, independent of code points or fonts. It has a registry number. A graphic character is often in the form of a spatial arrangement of adjacent or connected strokes; for example, a letter or digit.

graphic character modification. A feature that allows substitution or addition of graphic characters in an already-defined character arrangement.

host computer. The data processing unit to which the Model 3 is attached through an I/O channel interface.

image. In the Model 3, an image comprises a string of pels organized in scan lines to represent the contrasting portions of a picture. The image may consist of any data stored as a raster pattern; for example, line drawings, signatures, computer-generated halftones, logos, designs, symbols, or characters too large or small to be printed from fonts.

laser print head. A subassembly that emits a modulated beam of coherent light, which is scanned across the photoconductor to form an electrostatic image.

library character set. A named graphic character set stored in a host system library which can be specified for printing.

library object. A named resource that is stored in a host library system.

local storage. Printer storage into which data can be entered, held, and retrieved at a later date. Control storage contains microcode instructions and other control information; for example, the print buffer.

orientation. The number of degrees an object is rotated relative to a reference; for example, the orientation of a page relative to the sheet coordinates.

overlay. A collection of constant predefined data, such as lines, shading, text, boxes, or logos, that can be merged with variable data on a form, such as on a sheet while printing. See electronic overlay, forms overlay, and preprinted form.

overstriking. The merging of two or more characters in the same position on a sheet.

page. A logical entity that may take up part or all of a sheet. One or more pages can be printed on a sheet. A page to be printed cannot be larger than a sheet.

page buffer. (1) In compatibility mode, an area in control storage in which data are stored. The data are stored one line at a time until they are ready to be printed. (2) In page mode, see print buffer.

page data. The data that make up a composed page to be printed.

page mode. The mode of operation in which the printer can accept a sheet of data at a time from a host processor to be printed on an all-points addressable output medium.

page segment. An object that can contain text and images, and that can be included on a page or electronic overlay at any addressable point. It assumes the environment of the object in which it is included.

pel (print element). (1) An element of a raster pattern; a point about which a toned area on the photoconductor may appear. (2) On all-points addressable output medium, each pel is an addressable unit. On a row-column-addressable output medium, the only pel that is addressable is the beginning of a character cell. (3) Also termed a "pixel" or picture element.

pitch. A unit of measurement for the width of a printed character, reflecting the number of times a graphic character can be set in one linear inch. For example, 10-pitch has 10 graphic characters per inch. Uniformly spaced fonts are measured in pitches.

preprinted form. A preprinted design of constant data into which variable data can be merged.

print buffer. An area of control storage where data to be printed are stored until they are ready to be printed.

process assembly. The assembly that includes the air system, charge corona, cleaner, developer, drum, forms overlay, laser, operator panel, paper input ramp and splicer, and transfer station.

proportionally spaced font. A font in which the graphic characters are contained in character cells that vary with the size of each graphic character. This allows for even spacing between printed characters and eliminate excess white space around narrow characters, such as the letter "i."

raster pattern. A series of pels arranged in scan lines. The toned or not-toned status of each pel creates an image. A digitized raster pattern is an array of bits. The on or off status of each bit determines the tone or not-tone status of each pel. The width of a raster pattern is measured in pels, and the height in scan lines.

raster scan. A technique of generating or recording the elements of an image by a line-by-line sweep across the entire output medium.

raster pattern generator (RPG). The electronic circuits that retrieve digitized raster patterns and convert them into a series of scan patterns.

raster pattern storage (RPS). An area of storage that holds raster patterns for fonts and images.

rotated font. A font whose graphic character representations are rotated 90 or 270 degrees to allow for printing at those orientations on a sheet.

rotation. (1) The number of degrees a graphic character representation is rotated relative to its base line. (2) One of three directions that defines the orientation of text relative to a sheet, page, overlay, text block, or page segment.

text orientation. Sense of direction of text on a printed sheet. It is defined by specifying three parameters: baseline progression, inline progression, and rotation.

type size. (1) A measurement in pitch or points of the height and width of a graphic character in a font. (2) One of the many attributes of a font; others, for example, being weight and typeface.

type weight. (1) The degree of boldness of a typeface series caused by different thicknesses of the strokes that form a graphic character. (2) One of the many attributes of a font; others, for example, being size and typeface.

underscore. One or more lines under a graphic character. This function is supplied either through hardware or overstriking with an underscore character, a rule, or a font.

uniformly spaced font. A font in which the graphic characters are contained in character cells of uniform size. The distance between reference points of adjacent graphic characters is constant in the inline progression. The white space between the graphic characters may vary.

ACRONYMS

AEG: Active Environment Group
ANSI: American National Standards Institute
BDS: Begin Data Set (Structured Field)
CC: Carriage Control
CCW: Channel Command Word
CPDS: Composed Page Data Set
CPU: Central Processor Unit
CRT: Cathode Ray Tube
DASD: Direct Access Storage Device
FCB: Forms Control Buffer
EDS: End Data Set (Structured Field)
FORMDEF: Forms Definition File
ID: Identification
IDS: Input Data Set
IEU: Instruction Execution Unit
I/O: Input/Output
JCL: Job Control Language
MEG: Master Environment Group
ODS: Output Data Set
PAGEDEF: Page Definition File
PPWTR: Pending Page Writer
PSF: Print Services Facility
ROFD: Record Output Format Definition
SSPM: Systems Printing Manager
TRC: Table Reference Character

PROGRAM MODULES

DPROC: Document Processor Main Module
CCLR: Subsystem Clear and Reset
DDS: Data Set Processor
DLOAD: Resource Loader
DDOC: Process Document
DPEG: Page Environment Group Processor
DGFE: Generate Form Environment
DPOP: Page Processor
DGPE: Page Environment Group Subprocessor
DIPS: Included Page Segment Processor
DIMG: Image Processor
DTEXT: Text Processor
None given: SSPM Data Handler
None given: Composed Page Data Handler
Error

What is claimed is:

1. A method for preparing a plurality of visual displays of data on a visual display device in a system having a plurality of resources including segments stored as a plurality of sources of resource information each having a corresponding visual presentation control signal said data being prepared from an input data set comprising data-representing signals in which the data representing signals in the input data set are not fixed in a format suitable for said visual display device until storage thereof into a local memory of said visual display device, comprising the steps of:
    (a) selecting at least one of said plurality of stored sources of resource information required to effect desired ones of said visual displays of the input data set;
    (b) embedding into the input data set visual presentation control signals corresponding to said selected resource information to generate a single output data set comprising data-representing signals:
    (c) first transmitting the signal output data set to the local memory;
    (d) second transmitting separate from the first transmitting the selected resource information to the local memory;
    (e) receiving and storing the selected resource information and the single output data set in the local memory; and
    (f) visually presenting on the visual display device a plurality of differing displays of said single output data set in accordance with the received and stored information.

2. The method of claim 1 wherein step (c) further includes the step of storing said sources of resource information separately from said input data set and said output data set.

3. The method of claim 1 in which step (a) further includes selecting the source of resource information as defined by and under the control of at least one definition file which comprises at least one definition, and providing differing displays related to said definition contained in said definition file.

4. The method of claim 1 in which (a) further includes selecting the source of resource information as defined by and under the control of signals stored in at least one definition file which definition file comprises at least one definition and is stored separately from said input data set, said sources of resource information and said output data set.

5. The method of claim 4 which includes the further step of providing differing displays of the same output data set related to differing definition files.

6. The method of claim 5 which includes the further steps of providing a single definition file comprising differing definitions and providing differing displays of one or more transmissions of the output data set related to the differing definitions.

7. The method of claim 4 in which step (a) also includes determining a form environment as defined by and under the control of the resource information contained in a form definition file.

8. The method of claim 4 in which step (a) also includes determining a page environment as defined by an under the control of the resource information in at least one page definition file.

9. The method of claim 1 in which step (b) further includes embedding into the input data set visual presentation control signals under the control of signals stored in at least one definition file.

10. The method of claim 1 in which step (a) includes selecting the sources of resource information including selecting segment, overlay, font and graphic information.

11. The method of claim 1 in which steps (c) and (d) further includes the step of applying to said local memory selected resource information by way of a first logical channel and applying to said local memory the output data set by way of a second logical channel.

12. The method of claim 1 in which step (a) further includes the step of selecting only those stored sources of resource information which are not currently resident in the local memory.

13. The method of claim 1 including the further step of providing the visual display on an all points addressable device.

14. The method of claim 1 in which includes the step of determining whether the input data set contains line data, composed page data, or a combination of line data and composed page data.

15. The method of claim 14 wherein the input data set contains line data in which steps (a) and (b) include further steps of:
    determining, under the control of a page definition file, whether a record in the input data set requires fixed text and selecting said fixed text when said determination is affirmative;
    determining, under the control of a page definition file, whether a record in the input data set is to be suppressed and embedding a suppression code in said input data set when said determination is affirmative;
    determining, under the control of a page definition file, whether a record in the input data set requires a font and selecting that font when said determination is affirmative.

16. The method of claim 14 wherein the input data set contains composed page data in which step (a) includes one further step of either:
    (i) determining whether a record of an input data set requires a segment and selecting that segment when said determination is affirmative; and
    (ii) determining whether an input data set requires an image and selecting that image when said determination is affirmative.

17. The method of claim 16 in which step (a) (ii) is followed by the additional steps of:
    (iii) determining whether a record within the input data set requires text and selecting that text when said determination is affirmative; and
    (iv) determining whether an input data set requires a font and selecting that font when said determination is affirmative.

18. The method of claim 14 wherein the input data set contains a combination of line data and composed page data in which step (a) includes the further steps of:
    (i) determining whether a record within the input data set contains composed page data and, when said determination is affirmative, performing only one of the following further steps of:
    (ii) determining, under the control of a page definition file, whether said record requires a segment and selecting that segment when said determination is affirmative; and
    (iii) determining, under the control of a page definition file, whether said record requires an image and selecting that image when said determination is affirmative.

19. The method of claim 18 in which step (a) (iii) is followed by the further steps of:
    (iv) determining, under the control of the page definition file, whether a record of an input data set requires text and selecting that text when said determination is affirmative, and
    (v) determining, under the control of a page definition file, whether a record requires a font and selecting that font when said determination is affirmative.

20. The method of claim 1 wherein step (f) includes selectively suppressing data-representing signals within said input data set and visually displaying only non-suppressed data representing signals on said visual display device.

21. The method of claim 20 wherein step (c) includes transmitting both the suppressed and the non-suppressed data-representing signals to the local memory.

22. The method of claim 20 including the steps of:
    determining which data-representing signals within the input data set are candidates for suppression;
    priming said candidates for suppression by locating suppression-representing signals in a bracketing relationship with said candidates; and
    selectively suppressing said candidates under the control of a form definition file.

23. A method of preparing and displaying sets of input data-representing signals having first device-dependent characteristics for visual presentation on a visual display device requiring predetermined second device-specific characteristics including the steps of:
    (a) receiving a set of input data-representing signals containing first device-dependent control data;
    (b) receiving a plurality of sets of presentation-defining control data;
    (c) selecting predetermined ones of said received presentation-defining control data for use in corresponding visual presentations of said data-representing signals;
    (d) embedding in said set of input data-representing signals control characters for preparing the input data-representing signals for visual presentation and providing a single set of output data-representing signals; and
    (e) visually presenting said single set of output data-representing signals as a plurality of differing visual presentations in accordance with said respective selected presentation-defining signals.

24. A method of preparing sets of input data-representing signals for visual presentation according to claim 23 wherein step (c) further includes receiving control data for indicating spatial relationships of pages of text to visual presentation media in accordance with predetermined image presentation device characteristics.

25. A method of preparing sets of input data-representing signals for visual presentation according to claim 23 having the further step of including control data in each set of presentation-defining control data for indicating spatial relationships of records of text to visual presentation media in accordance with predetermined image presentation device characteristics.

26. A method of preparing sets of input data-representing signals for visual presentation according to claim 23 having the further step of including control data for indicating spatial relationships of fields of text to visual presentation media in accordance with predetermined image presentation device characteristics.

27. A method of preparing sets of input data-representing signals for visual presentation according to claim 23 having the further step of including control data in each set of presentation-defining control data for indicating spatial relationships of characters of text to visual presentation media in accordance with predetermined image presentation device characteristics.

28. A method for preparing a visual display of one set of data-representing signals as a plurality of differing visual presentations comprising the steps of:
   (a) receiving and storing said single set of output data-representing signals within local storage located within a visual display device;
   (b) receiving and storing a plurality of sets of form-defining signals; and
   (c) preparing a plurality of differing visual presentations of said locally stored single set of output data-representing signals in which the form of each of said differing visual displays is defined in accordance with said sets of form-defining signals.

29. The method of claim 28 having the further step of including in each set of form-defining signals further signals for representing spatial relationships of predetermined portions of said data-representing signals to an image-receiving medium.

30. A method of converting an input data set of data-representing signals which contains diverse known data formats into an output data set on having a format suitable for an all-points addressable visual display device in a system having a plurality of resources including segments stored as a plurality of sources of resource information each having a corresponding visual presentation control character, comprising the steps of:
   (a) recognizing a conversion requirement in the input data set for one of said plurality of sources of resource information;
   (b) selecting at least one source of resource information recognized as a conversion requirement;
   (c) embedding in said input data set the control character representative of said selected resource information thereby forming said output data set;
   (d) transmitting a first plurality of signals comprising the selected resource information to said all-points addressable visual display device;
   (e) controlling said all-points addressable visual display device for storing and indexing the selected resource information;
   (f) transmitting separate from the transmittal of the first plurality of signals a second plurality of signals representing a single output data set to the all-points addressable visual display device for first creating a format suitable for visual display on the all-points addressable visual display device; and,
   (g) visually presenting said single output data set as a plurality of differing visual presentations by said all-points addressable visual display device in accordance with the transmitted signals.

31. The method of claim 30 in which step (a) includes recognizing said conversion requirement for one of said plurality of sources of resource information under the direction of the information in a definition file.

32. The method of claim 30 in which step (b) includes selecting at least one of said sources of resource information under the direction of the information contained in a definition file.

33. The method of claim 30 in which step (c) includes embedding a control character under the direction of the information contained in a definition file.

34. The method of claim 30 in which step (b) includes selecting at least one of said sources of resource information including selecting segment, overlay, font and graphic information.

35. The method of claim 30 in which step (d) includes transmitting only those sources of resource information which are not currently resident in local memory.

36. The method of claim 30 in which step (d) includes transmitting the first plurality of signals comprising sources of resource information to the all-points addressable visual display device by way of a first logical channel.

37. The method of claim 36 in which step (f) includes transmitting the second plurality of signals comprising the output data set by way of a second logical channel.

38. The method of claim 30 which includes determining whether the input data set contains line data composed page data, or a combination of line data and composed page data.

39. A method of reformatting formatted user data to be visually presented wherein said formatted user data include predetermined embedded format control data for controlling visual presentation of the formatted user data;
   including the steps of:
   receiving said formatted user data with its embedded format control data;
   receiving a format control data set including line descriptor data, said line descriptor data having a plurality of line descriptor elements arranged in chained lists, each of said line descriptor elements including data for indicating predetermined visual presentation parameters, said parameters including format controls, sequence of data presentation change controls, and informational content change controls said parameters affecting visual presentation of said formatted user data;
   examining said formatted user data in sequence of receipt including examining said embedded format control data;
   examining said embedded format control data;
   accessing said received format control data sets in a sequence indicated by said chained list in said examination; and
   responding to said visual presentation parameters in the respective line descriptor elements to alter said received format user data and provide a single set of reformatted user data such that visual presentation of the single set of reformatted user data is modified selectively for visually presenting said single set of reformatted user data as a plurality of differing visual presentations in accordance with the accessed line descriptor elements' respective visual parameter data including the steps of modifying the format, the sequence of presentation and the informational content of the visual presentation of the reformatted user data in accordance with, respectively, said format controls, said sequence of data presentation controls, and said informational content change controls of said line descriptor elements.

40. A system for preparing visual displays of data on a visual display device, said displays being prepared from an input data set comprising data-representing signals which data in the input data set are not fixed into a format suitable for display on the visual display device until storage thereof into local memory of the visual display device comprising:
 (a) a plurality of stored sources of resource information required to effect said visual displays of the input data set, the plurality of stored sources of resource information including at least segments;
 (b) means for selecting at least one of said plurality of stored sources of resource information required to effect desired ones of said visual displays;
 (c) means for deriving visual presentation control signals from the selected resource information;
 (d) means for embedding said visual presentation control signals into the input data set to generate a single output data set comprising data-representing signals;
 (e) means for second transmitting the single output data set to the local memory;
 (f) means for second transmitting separate from the first transmitting the selected resource information to the local memory;
 (g) means for receiving and storing the selected resource information and the output data set in the local memory; and,
 (h) said visual display device including means for visually presenting a plurality of differing visual displays of said single output data set in accordance with the received and stored information.

41. The system of claim 40 in which said storing means include additional means for storing said resource information separately from said input data set and said output data set.

42. The system of claim 40 in which said selecting means includes means for selecting the source of resource information under the control of signals stored in at least one definition file which comprises at least one definition, and providing differing displays related to said definition in said definition file.

43. The system of claim 40 in which there is provided at least one definition file means comprising at least one definition for controlling the selection of said stored source of resource information, and said storing means includes additional means for storing said definition file means separately from said input data set, said stored sources of resources information and said output data set.

44. The system of claim 43 in which said definition file means includes means for providing desired differing displays of the same output data set related to differing definition files.

45. The system of claim 44 in which said definition file means includes a single definition file containing differing definitions and providing desired differing displays of one or more transmissions of the output data set related to the differing definitions.

46. The system of claim 43 in which the definition file means includes a form definition file means for determining a form environment as defined by and under the control of the resource information contained in said form definition file means.

47. The system of claim 43 in which the definition file means includes a page definition file means for determining a page environment as defined by and under the control of the resource information in at least one of said page definition file means.

48. The system of claim 40 in which there is provided means for embedding into the input data set visual presentation control signals under the control of signals stored in at least one definition file.

49. The system of claim 40 in which said plurality of sources of resource information rather includes overlay, font and graphic information.

50. The system of claim 40 in which there is provided first logical channel means for transmitting said selected resource information in said local memory and second logical channel means for transmitting said output data set in said local memory.

51. The system of claim 40 in which the visual display device comprises an all-points addressable printer.

52. The system of claim 40 in which there is provided means for determining whether the input data set contains line data, composed page data, or a combination of line data and composed page data.

53. The system of claim 52 wherein the input data set contains line data including:
 means for determining, under control of the page definition file, whether a record in the input data set requires fixed text and means for selecting said fixed text when the determination is affirmative;
 means for determining, under the control of the page definition file, whether a record in the input data set is to be suppressed and means for embedding a suppression code in said input data set when the determination is affirmative; and
 means for determining, under the control of a page definition file, whether a record in the input data set requires a font and means for selecting that font when the determination is affirmative.

54. The system of claim 52 wherein the input data set contains composed page data which includes:
 (i) means for determining whether a record in the input data set requires a segment and means for selecting that segment when the determination is affirmative; and
 (ii) means for determining whether an input data set requires an image and means for selecting that image when the determination is affirmative.

55. The system of claim 54 in which there is further provided:
 (iii) means for determining whether a record within the input data set requires text and means for selecting that text when the determination is affirmative; and
 (iv) means for determining whether an input data set requires a font and means for selecting that font when the determination is affirmative.

56. The system of claim 52 wherein the input data set contains a combination of line data and composed page data which includes:
 (i) means for determining whether a record within the input data set contains composed page data and, when the determination is affirmative, further including:
 (ii) means for determining whether said record requires a segment and means for selecting that segment when the determination is affirmative;

(iii) means for determining whether said record requires an image and means for selecting that image when the determination is affirmative;

(iv) means for determining whether a record of an input data set requires text and means for selecting that text when the determination is affirmative; and (v) means for determining whether a record requires a font and means for selecting that font when the determination is affirmative.

57. A system for creating a visual display of one set of data-representing signals as a plurality of differing visual presentations comprising:

(a) means for receiving a single set of output data-representing signals and means for storing said signals within local storage located within a visual display device;

(b) means for receiving a plurality of sets of form-defining signals and means for storing said form-defining signals and;

(c) means for creating a plurality of differing visual presentations of said locally stored single set of output data-representing signals in which the form of each of said differing visual displays is defined in accordance with said sets of form-defining signals.

58. The system of claim 57 in which each set of form-defining signals includes further signals for representing spatial relationships of predetermined portions of said data-representing signals to an imagereceiving medium.

59. A system for converting an input data set of data-representing signals which contains diverse known data formats into an output data set suitable for visual display on an all-points addressable visual display device said system having a plurality of sources of resource information including segments, comprising the steps of:

(a) means for recognizing a conversion requirement in the input data set for one of a plurality of sources of resource information;

(b) means for selecting at least one of said sources of resource information recognized as a conversion requirement;

(c) means for embedding in said input data set a control character representative of said selected resource information thereby forming a single output data set;

(d) means for transmitting a first plurality of signals as comprising the selected resource information to the all-points addressable visual display device;

(e) means for controlling the all-points addressable visual display device for storing and indexing the selected resource information;

(f) means for transmitting separate from the transmittal of the first plurality of signals a second plurality of signals representing the single output data set to the all-points addressable visual display device for first creating a format suitable for visual display on the all-points addressable visual display device in accordance with the transmitted signals; and, (g) said visual display device including means for visually presenting a plurality of differing visual displays of said single output data set in accordance with the transmitted signals.

60. The system of claim 59 in which there is provided page definition file means for controlling the recognition and the selection of the sources of resource information.

61. The system of claim 59 in which there is provided page definition means for controlling the embedding of said control character.

62. The system of claim 59 in which said plurality of sources of resource information rather includes overlay, font and graphic information.

63. The system of claim 59 in which there is provided means for determining whether said input data set contains line data, composed page data, or a combination of line data and composed page data.

64. The machine-implemented method of visually presenting a plurality of differing displays of text from a single data set, said single data set having a plurality of named records, each named record having a plurality of named fields of text-representing signals;

including the steps, in combination:

embedding inclusion control signals in said data set with each of said fields, the inclusion of predetermined portions of said text-representing signals being controlled by said inclusion control signals, some of said inclusion control signals indicating that such controlled text-representing signals are not to be included in a given visual presentation when predetermined control indicia are encountered;

receiving a set of form-defining signals (termed FORMDEF), each set of which includes control indicia relating to said inclusion control signals for selectively permitting inclusion of text-representing signals in a given visual presentation that are associated with predetermined ones of said inclusion control signals; and presenting differing visual presentations of said single data set in accordance with said FORMDEF's including selecting predetermined portions of said single data set in accordance with said FORMDEF and inhibiting presentations based on said related text-representing signals and leaving background space in each visual presentation for said not-included text-representing signals.

65. The machine-implemented method of visually presenting one set of image-representing signals as a plurality of different visual items;

including the steps, in combination:

receiving and storing said one set of image-representing signals locally to an image-presentation device;

receiving and storing a plurality of sets of form-defining signals (each set termed a FORMDEF), each said FORMDEF including signals for representing spatial relationships of predetermined portions of said image-representing signals to an image-receiving medium; and for successive visual presentations of a given portion of said received image-representing signals, selecting a different one of said FORMDEF's for defining a visual image on said image-receiving medium such that each successive presentation of said locally stored image-representing signals has a different format and content in accordance with said selected FORMDEF's.

* * * * *